US011030955B2

(12) United States Patent
Chaji

(10) Patent No.: US 11,030,955 B2
(45) Date of Patent: Jun. 8, 2021

(54) PIXEL CIRCUITS FOR AMOLED DISPLAYS

(71) Applicant: Ignis Innovation Inc., Waterloo (CA)

(72) Inventor: Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 134 days.

(21) Appl. No.: 15/958,143

(22) Filed: Apr. 20, 2018

(65) Prior Publication Data

US 2018/0240407 A1 Aug. 23, 2018

Related U.S. Application Data

(63) Continuation of application No. 14/363,379, filed as application No. PCT/IB2013/060755 on Dec. 9, (Continued)

(51) Int. Cl.
*G06F 1/00* (2006.01)
*G09G 3/3258* (2016.01)
(Continued)

(52) U.S. Cl.
CPC ......... *G09G 3/3258* (2013.01); *G09G 3/3233* (2013.01); *G09G 3/3291* (2013.01); (Continued)

(58) Field of Classification Search
CPC .......... G09G 3/32; G09G 5/10; G09G 3/3258; G09G 5/00; G09G 3/30; G06F 3/038
See application file for complete search history.

(56) References Cited

U.S. PATENT DOCUMENTS

| | | | |
|---|---|---|---|
| 3,506,851 | A | 4/1970 | Polkinghorn et al. |
| 3,750,987 | A | 8/1973 | Gobel |

(Continued)

FOREIGN PATENT DOCUMENTS

| | | |
|---|---|---|
| AU | 729652 | 6/1997 |
| AU | 764896 | 12/2001 |

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Michael A Faragalla
(74) *Attorney, Agent, or Firm* — Stratford Managers Corporation

(57) ABSTRACT

A system for controlling a display in which each pixel circuit comprises a light-emitting device, a drive transistor, a storage capacitor, a reference voltage source, and a programming voltage source. The storage capacitor stores a voltage equal to the difference between the reference voltage and the programming voltage, and a controller supplies a programming voltage that is a calibrated voltage for a known target current, reads the actual current passing through the drive transistor to a monitor line, turns off the light emitting device while modifying the calibrated voltage to make the current supplied through the drive transistor substantially the same as the target current, modifies the calibrated voltage to make the current supplied through the drive transistor substantially the same as the target current, and determines a current corresponding to the modified calibrated voltage based on predetermined current-voltage characteristics of the drive transistor.

21 Claims, 30 Drawing Sheets

Related U.S. Application Data

2013, now Pat. No. 9,978,310, which is a continuation of application No. 13/710,872, filed on Dec. 11, 2012, now Pat. No. 9,786,223.

(60) Provisional application No. 61/815,698, filed on Apr. 24, 2013.

(51) Int. Cl.
*G09G 3/3291* (2016.01)
*G09G 3/3233* (2016.01)

(52) U.S. Cl.
CPC ............... *G09G 2300/0408* (2013.01); *G09G 2300/0819* (2013.01); *G09G 2300/0842* (2013.01); *G09G 2300/0861* (2013.01); *G09G 2320/0295* (2013.01); *G09G 2320/0693* (2013.01); *G09G 2330/10* (2013.01)

(56) References Cited

U.S. PATENT DOCUMENTS 3,774,055 A 11/1973 Bapat et al.
4,090,096 A 5/1978 Nagami
4,354,162 A 10/1982 Wright
4,996,523 A 2/1991 Bell et al.
5,134,387 A 7/1992 Smith et al.
5,153,420 A 10/1992 Hack et al.
5,170,158 A 12/1992 Shinya
5,204,661 A 4/1993 Hack et al.
5,266,515 A 11/1993 Robb et al.
5,278,542 A 1/1994 Smith et al.
5,408,267 A 4/1995 Main
5,498,880 A 3/1996 Lee et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,691,783 A 11/1997 Numao et al.
5,701,505 A 12/1997 Yamashita et al.
5,714,968 A 2/1998 Ikeda
5,744,824 A 4/1998 Kousai et al.
5,745,660 A 4/1998 Kolpatzik et al.
5,748,160 A 5/1998 Shieh et al.
5,758,129 A 5/1998 Gray et al.
5,835,376 A 11/1998 Smith et al.
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,949,398 A 9/1999 Kim
5,952,789 A 9/1999 Stewart et al.
5,990,629 A 11/1999 Yamada et al.
6,023,259 A 2/2000 Howard et al.
6,069,365 A 5/2000 Chow et al.
6,091,203 A 7/2000 Kawashima et al.
6,097,360 A 8/2000 Holloman
6,100,868 A 8/2000 Lee et al.
6,144,222 A 11/2000 Ho
6,229,506 B1 5/2001 Dawson et al.
6,229,508 B1 5/2001 Kane
6,246,180 B1 6/2001 Nishigaki
6,252,248 B1 6/2001 Sano et al.
6,268,841 B1 7/2001 Cairns et al.
6,288,696 B1 9/2001 Holloman
6,307,322 B1 10/2001 Dawson et al.
6,310,962 B1 10/2001 Chung et al.
6,323,631 B1 11/2001 Juang
6,333,729 B1 12/2001 Ha
6,384,804 B1 5/2002 Dodabalapur et al.
6,388,653 B1 5/2002 Goto et al.
6,392,617 B1 5/2002 Gleason
6,396,469 B1 5/2002 Miwa et al.
6,414,661 B1 7/2002 Shen et al.
6,417,825 B1 7/2002 Stewart et al.
6,430,496 B1 8/2002 Smith et al.
6,433,488 B1 8/2002 Bu
6,473,065 B1 10/2002 Fan
6,475,845 B2 11/2002 Kimura
6,501,098 B2 12/2002 Yamazaki
6,501,466 B1 12/2002 Yamagashi et al.
6,522,315 B2 2/2003 Ozawa et al.
6,535,185 B2 3/2003 Kim et al.
6,542,138 B1 4/2003 Shannon et al.
6,559,839 B1 5/2003 Ueno et al.
6,580,408 B1 6/2003 Bae et al.
6,583,398 B2 6/2003 Harkin
6,618,030 B2 9/2003 Kane et al.
6,639,244 B1 10/2003 Yamazaki et al.
6,680,580 B1 1/2004 Sung
6,686,699 B2 2/2004 Yumoto
6,690,000 B1 2/2004 Muramatsu et al.
6,693,610 B2 2/2004 Shannon et al.
6,694,248 B2 2/2004 Smith et al.
6,697,057 B2 2/2004 Koyama et al.
6,724,151 B2 4/2004 Yoo
6,734,636 B2 5/2004 Sanford et al.
6,753,655 B2 6/2004 Shih et al.
6,753,834 B2 6/2004 Mikami et al.
6,756,741 B2 6/2004 Li
6,756,958 B2 6/2004 Furuhashi
6,756,985 B1 6/2004 Hirotsune
6,777,888 B2 8/2004 Kondo
6,781,567 B2 8/2004 Kimura
6,788,231 B1 9/2004 Hsueh
6,809,706 B2 10/2004 Shimoda
6,828,950 B2 12/2004 Koyama
6,858,991 B2 2/2005 Miyazawa
6,859,193 B1 2/2005 Yumoto
6,876,346 B2 4/2005 Anzai et al.
6,900,485 B2 5/2005 Lee
6,903,734 B2 6/2005 Eu
6,911,960 B1 6/2005 Yokoyama
6,911,964 B2 6/2005 Lee et al.
6,914,448 B2 7/2005 Jinno
6,919,871 B2 7/2005 Kwon
6,924,602 B2 8/2005 Komiya
6,937,220 B2 8/2005 Kitaura et al.
6,940,214 B1 9/2005 Komiya et al.
6,954,194 B2 10/2005 Matsumoto et al.
6,970,149 B2 11/2005 Chung et al.
6,975,142 B2 12/2005 Azami et al.
6,975,332 B2 12/2005 Arnold et al.
6,995,519 B2 2/2006 Arnold et al.
7,027,015 B2 4/2006 Booth, Jr. et al.
7,034,793 B2 4/2006 Sekiya et al.
7,038,392 B2 5/2006 Libsch et al.
7,057,588 B2 6/2006 Asano et al.
7,061,451 B2 6/2006 Kimura
7,071,932 B2 7/2006 Libsch et al.
7,106,285 B2 9/2006 Naugler
7,112,820 B2 9/2006 Chang et al.
7,113,864 B2 9/2006 Smith et al.
7,122,835 B1 10/2006 Ikeda et al.
7,129,914 B2 10/2006 Knapp et al.
7,164,417 B2 1/2007 Cok
7,224,332 B2 5/2007 Cok
7,248,236 B2 7/2007 Nathan et al.
7,259,737 B2 8/2007 Ono et al.
7,262,753 B2 8/2007 Tanghe et al.
7,274,363 B2 9/2007 Ishizuka et al.
7,310,092 B2 12/2007 Imamura
7,315,295 B2 1/2008 Kimura
7,317,434 B2 1/2008 Lan et al.
7,321,348 B2 1/2008 Cok et al.
7,327,357 B2 2/2008 Jeong
7,333,077 B2 2/2008 Koyama et al.
7,343,243 B2 3/2008 Smith et al.
7,414,600 B2 8/2008 Nathan et al.
7,466,166 B2 12/2008 Date et al.
7,495,501 B2 2/2009 Iwabuchi et al.
7,502,000 B2 3/2009 Yuki et al.

(56) References Cited

U.S. PATENT DOCUMENTS 7,515,124 B2 4/2009 Yaguma et al.
7,535,449 B2 5/2009 Miyazawa
7,554,512 B2 6/2009 Steer
7,569,849 B2 8/2009 Nathan et al.
7,595,776 B2 9/2009 Hashimoto et al.
7,604,718 B2 10/2009 Zhang et al.
7,609,239 B2 10/2009 Chang
7,612,745 B2 11/2009 Yumoto et al.
7,619,594 B2 11/2009 Hu
7,619,597 B2 11/2009 Nathan et al.
7,639,211 B2 12/2009 Miyazawa
7,683,899 B2 3/2010 Hirakata et al.
7,688,289 B2 3/2010 Abe et al.
7,760,162 B2 7/2010 Miyazawa
7,808,008 B2 10/2010 Miyake
7,859,520 B2 12/2010 Kimura
7,889,159 B2 2/2011 Nathan et al.
7,903,127 B2 3/2011 Kwon
7,920,116 B2 4/2011 Woo et al.
7,944,414 B2 5/2011 Shirasaki et al.
7,978,170 B2 7/2011 Park et al.
7,989,392 B2 8/2011 Crockett et al.
7,995,008 B2 8/2011 Miwa
8,063,852 B2 11/2011 Kwak et al.
8,102,343 B2 1/2012 Yatabe
8,144,081 B2 3/2012 Miyazawa
8,159,007 B2 4/2012 Barna et al.
8,242,979 B2 8/2012 Anzai et al.
8,253,665 B2 8/2012 Nathan et al.
8,283,967 B2 10/2012 Chaji et al.
8,319,712 B2 11/2012 Nathan et al.
8,564,513 B2 10/2013 Nathan et al.
8,872,739 B2 10/2014 Kimura
9,336,717 B2 5/2016 Chaji et al.
9,430,958 B2 8/2016 Chaji et al.
9,466,240 B2 10/2016 Jaffari et al.
9,472,138 B2 10/2016 Nathan et al.
9,659,527 B2 5/2017 Williams
9,685,114 B2 7/2017 Chaji
9,697,771 B2 7/2017 Azizi et al.
9,721,505 B2 8/2017 Chaji et al.
9,741,292 B2 8/2017 Nathan et al.
9,747,834 B2 8/2017 Chaji
RE46,561 E 9/2017 Chaji et al.
2001/0002703 A1 6/2001 Koyama
2001/0009283 A1 7/2001 Arao et al.
2001/0024186 A1 9/2001 Kane et al.
2001/0026257 A1 10/2001 Kimura
2001/0030323 A1 10/2001 Ikeda
2001/0035863 A1 11/2001 Kimura
2001/0040541 A1 11/2001 Yoneda et al.
2001/0043173 A1 11/2001 Troutman
2001/0045929 A1 11/2001 Prache
2001/0052940 A1 12/2001 Hagihara et al.
2002/0000576 A1 1/2002 Inukai
2002/0011796 A1 1/2002 Koyama
2002/0011799 A1 1/2002 Kimura
2002/0012057 A1 1/2002 Kimura
2002/0030190 A1 3/2002 Ohtani et al.
2002/0047565 A1 4/2002 Nara et al.
2002/0052086 A1 5/2002 Maeda
2002/0080108 A1 6/2002 Wang
2002/0084463 A1 7/2002 Sanford et al.
2002/0101172 A1 8/2002 Bu
2002/0117722 A1 8/2002 Osada et al.
2002/0140712 A1 10/2002 Ouchi et al.
2002/0158587 A1 10/2002 Komiya
2002/0158666 A1 10/2002 Azami et al.
2002/0158823 A1 10/2002 Zavracky et al.
2002/0171613 A1 11/2002 Goto et al.
2002/0181276 A1 12/2002 Yamazaki
2002/0186214 A1 12/2002 Siwinski
2002/0190971 A1 12/2002 Nakamura et al.
2002/0195967 A1 12/2002 Kim et al.
2002/0195968 A1 12/2002 Sanford et al.
2002/0196213 A1 12/2002 Akimoto et al.
2003/0001828 A1 1/2003 Asano
2003/0001858 A1 1/2003 Jack
2003/0016190 A1 1/2003 Kondo
2003/0020413 A1 1/2003 Oomura
2003/0030603 A1 2/2003 Shimoda
2003/0062524 A1 4/2003 Kimura
2003/0062844 A1 4/2003 Miyazawa
2003/0076048 A1 4/2003 Rutherford
2003/0090445 A1 5/2003 Chen et al.
2003/0090447 A1 5/2003 Kimura
2003/0090481 A1 5/2003 Kimura
2003/0095087 A1 5/2003 Libsch
2003/0098829 A1 5/2003 Chen et al.
2003/0107560 A1 6/2003 Yumoto et al.
2003/0107561 A1 6/2003 Uchino et al.
2003/0111966 A1 6/2003 Mikami et al.
2003/0112205 A1 6/2003 Yamada
2003/0112208 A1 6/2003 Okabe et al.
2003/0117348 A1 6/2003 Knapp et al.
2003/0122474 A1 7/2003 Lee
2003/0122747 A1 7/2003 Shannon et al.
2003/0128199 A1 7/2003 Kimura
2003/0151569 A1 8/2003 Lee et al.
2003/0156104 A1 8/2003 Morita
2003/0169241 A1 9/2003 LeChevalier
2003/0169247 A1 9/2003 Kawabe et al.
2003/0174152 A1 9/2003 Noguchi
2003/0179626 A1 9/2003 Sanford et al.
2003/0185438 A1 10/2003 Osawa et al.
2003/0189535 A1 10/2003 Matsumoto et al.
2003/0197663 A1 10/2003 Lee et al.
2003/0214465 A1 11/2003 Kimura
2003/0227262 A1 12/2003 Kwon
2003/0230141 A1 12/2003 Gilmour et al.
2003/0230980 A1 12/2003 Forrest et al.
2004/0004589 A1 1/2004 Shih
2004/0032382 A1 2/2004 Cok et al.
2004/0041750 A1 3/2004 Abe
2004/0066357 A1 4/2004 Kawasaki
2004/0070557 A1 4/2004 Asano et al.
2004/0070558 A1 4/2004 Cok
2004/0090186 A1 5/2004 Yoshida et al.
2004/0095338 A1 5/2004 Miyazawa
2004/0129933 A1 7/2004 Nathan et al.
2004/0130516 A1 7/2004 Nathan et al.
2004/0135749 A1 7/2004 Kondakov et al.
2004/0145547 A1 7/2004 Oh
2004/0150595 A1 8/2004 Kasai
2004/0155841 A1 8/2004 Kasai
2004/0160516 A1 8/2004 Ford
2004/0171619 A1 9/2004 Barkoczy et al.
2004/0174349 A1 9/2004 Libsch
2004/0174354 A1 9/2004 Ono
2004/0183759 A1 9/2004 Stevenson et al.
2004/0189627 A1 9/2004 Shirasaki et al.
2004/0196275 A1 10/2004 Hattori
2004/0227697 A1 11/2004 Mori
2004/0239696 A1 12/2004 Okabe
2004/0251844 A1 12/2004 Hashido et al.
2004/0252085 A1 12/2004 Miyagawa
2004/0252089 A1 12/2004 Ono et al.
2004/0256617 A1 12/2004 Yamada et al.
2004/0257353 A1 12/2004 Imamura et al.
2004/0257355 A1 12/2004 Naugler
2004/0263437 A1 12/2004 Hattori
2005/0007357 A1 1/2005 Yamashita et al.
2005/0052379 A1 3/2005 Waterman
2005/0057459 A1 3/2005 Miyazawa
2005/0067970 A1 3/2005 Libsch et al.
2005/0067971 A1 3/2005 Kane
2005/0083270 A1 4/2005 Miyazawa
2005/0110420 A1 5/2005 Arnold et al.
2005/0110727 A1 5/2005 Shin
2005/0123193 A1 6/2005 Lamberg et al.
2005/0140600 A1 6/2005 Kim et al.
2005/0140610 A1 6/2005 Smith et al.
2005/0145891 A1 7/2005 Abe
2005/0156831 A1 7/2005 Yamazaki et al.

(56) References Cited

U.S. PATENT DOCUMENTS

2005/0168416 A1 8/2005 Hashimoto et al.
2005/0206590 A1 9/2005 Sasaki et al.
2005/0212787 A1 9/2005 Noguchi et al.
2005/0219188 A1 10/2005 Kawabe et al.
2005/0243037 A1 11/2005 Eom et al.
2005/0248515 A1 11/2005 Naugler et al.
2005/0258867 A1 11/2005 Miyazawa
2005/0285822 A1 12/2005 Reddy et al.
2005/0285825 A1 12/2005 Eom et al.
2006/0012311 A1 1/2006 Ogawa
2006/0022305 A1 2/2006 Yamashita
2006/0038750 A1 2/2006 Inoue et al.
2006/0038758 A1 2/2006 Routley et al.
2006/0038762 A1 2/2006 Chou
2006/0066533 A1 3/2006 Sato et al.
2006/0077077 A1 4/2006 Kwon
2006/0077134 A1 4/2006 Hector
2006/0077194 A1 4/2006 Jeong
2006/0092185 A1 5/2006 Jo et al.
2006/0114196 A1 6/2006 Shin
2006/0125408 A1 6/2006 Nathan et al.
2006/0125740 A1 6/2006 Shirasaki et al.
2006/0139253 A1 6/2006 Choi et al.
2006/0145964 A1 7/2006 Park et al.
2006/0158402 A1 7/2006 Nathan
2006/0191178 A1 8/2006 Sempel et al.
2006/0208971 A1 9/2006 Deane
2006/0209012 A1 9/2006 Hagood, IV
2006/0214888 A1 9/2006 Schneider et al.
2006/0221009 A1 10/2006 Miwa
2006/0227082 A1 10/2006 Ogata et al.
2006/0232522 A1 10/2006 Roy et al.
2006/0244391 A1 11/2006 Shishido et al.
2006/0244697 A1 11/2006 Lee et al.
2006/0261841 A1 11/2006 Fish
2006/0279478 A1 12/2006 Ikegami
2006/0290614 A1 12/2006 Nathan et al.
2007/0001939 A1 1/2007 Hashimoto et al.
2007/0001945 A1 1/2007 Yoshida et al.
2007/0008251 A1 1/2007 Kohno et al.
2007/0008297 A1 1/2007 Bassetti
2007/0035489 A1 2/2007 Lee
2007/0035707 A1 2/2007 Margulis
2007/0040773 A1 2/2007 Lee et al.
2007/0040782 A1 2/2007 Woo et al.
2007/0057873 A1 3/2007 Uchino et al.
2007/0057874 A1 3/2007 Le Roy et al.
2007/0063932 A1 3/2007 Nathan et al.
2007/0075957 A1 4/2007 Chen
2007/0080908 A1 4/2007 Nathan et al.
2007/0085801 A1 4/2007 Park et al.
2007/0109232 A1 5/2007 Yamamoto et al.
2007/0128583 A1 6/2007 Miyazawa
2007/0164941 A1 7/2007 Park et al.
2007/0182671 A1 8/2007 Nathan et al.
2007/0236430 A1 10/2007 Fish
2007/0236440 A1 10/2007 Wacyk et al.
2007/0241999 A1 10/2007 Lin
2007/0242008 A1 10/2007 Cummings
2008/0001544 A1 1/2008 Murakami et al.
2008/0043044 A1 2/2008 Woo et al.
2008/0048951 A1 2/2008 Naugler et al.
2008/0055134 A1 3/2008 Li et al.
2008/0062106 A1 3/2008 Tseng
2008/0074360 A1 3/2008 Lu et al.
2008/0088549 A1 4/2008 Nathan et al.
2008/0094426 A1 4/2008 Kimpe
2008/0111766 A1 5/2008 Uchino et al.
2008/0111812 A1* 5/2008 Shirasaki ............. G09G 3/3233 345/212
2008/0122819 A1 5/2008 Cho et al.
2008/0129906 A1 6/2008 Lin et al.
2008/0198103 A1 8/2008 Toyomura et al.
2008/0219232 A1 9/2008 Heubel
2008/0228562 A1 9/2008 Smith et al.
2008/0231625 A1 9/2008 Minami et al.
2008/0231641 A1 9/2008 Miyashita
2008/0265786 A1 10/2008 Koyama
2008/0290805 A1 11/2008 Yamada et al.
2008/0316163 A1* 12/2008 Van Den Homberg ..................... G09G 3/3685 345/98
2009/0009459 A1 1/2009 Miyashita
2009/0015532 A1 1/2009 Katayama et al.
2009/0058789 A1 3/2009 Hung et al.
2009/0121988 A1 5/2009 Amo et al.
2009/0146926 A1 6/2009 Sung et al.
2009/0153448 A1 6/2009 Tomida et al.
2009/0153459 A9 6/2009 Han et al.
2009/0174628 A1 7/2009 Wang et al.
2009/0201230 A1 8/2009 Smith
2009/0201281 A1 8/2009 Routley et al.
2009/0206764 A1 8/2009 Schemmann et al.
2009/0225011 A1 9/2009 Choi
2009/0244046 A1 10/2009 Seto
2009/0251486 A1 10/2009 Sakakibara
2009/0278777 A1 11/2009 Wang
2009/0289964 A1 11/2009 Miyachi
2009/0295423 A1 12/2009 Levey
2010/0026725 A1 2/2010 Smith
2010/0033469 A1 2/2010 Nathan
2010/0039451 A1 2/2010 Jung
2010/0039453 A1 2/2010 Nathan
2010/0039458 A1 2/2010 Nathan
2010/0045646 A1 2/2010 Kishi
2010/0079419 A1 4/2010 Shibusawa
2010/0134475 A1 6/2010 Ogura
2010/0141564 A1 6/2010 Choi et al.
2010/0141626 A1 6/2010 Tomida
2010/0207920 A1 8/2010 Chaji et al.
2010/0225634 A1 9/2010 Levey et al.
2010/0251295 A1 9/2010 Amento et al.
2010/0269889 A1 10/2010 Reinhold et al.
2010/0277400 A1 11/2010 Jeong
2010/0315319 A1 12/2010 Cok et al.
2010/0315449 A1 12/2010 Chaji
2011/0050741 A1 3/2011 Jeong
2011/0063197 A1 3/2011 Chung et al.
2011/0069089 A1 3/2011 Kopf et al.
2011/0074762 A1 3/2011 Shirasaki
2011/0084993 A1 4/2011 Kawabe
2011/0109350 A1 5/2011 Chaji et al.
2011/0169805 A1 7/2011 Yamazaki
2011/0191042 A1 8/2011 Chaji
2011/0205221 A1* 8/2011 Lin ...................... G09G 3/2092 345/213
2012/0026146 A1* 2/2012 Kim ..................... G09G 3/3233 345/211
2012/0169793 A1 7/2012 Nathan
2012/0299976 A1 11/2012 Chen et al.
2012/0299978 A1 11/2012 Chaji
2014/0267215 A1 9/2014 Soni

FOREIGN PATENT DOCUMENTS

CA 1 294 034 1/1992
CA 2 249 592 7/1998
CA 2 303 302 3/1999
CA 2 368 386 9/1999
CA 2 242 720 1/2000
CA 2 354 018 6/2000
CA 2 432 530 7/2002
CA 2 436 451 8/2002
CA 2 507 276 8/2002
CA 2 463 653 1/2004
CA 2 498 136 3/2004
CA 2 522 396 11/2004
CA 2 438 363 2/2005
CA 2 443 206 3/2005
CA 2 519 097 3/2005
CA 2 472 671 12/2005
CA 2 523 841 1/2006
CA 2 567 076 1/2006

(56) References Cited

FOREIGN PATENT DOCUMENTS

| | | | |
|---|---|---|---|
| CA | 2 495 726 | | 7/2006 |
| CA | 2 557 713 | | 11/2006 |
| CA | 2 526 782 | C | 8/2007 |
| CA | 2 651 893 | | 11/2007 |
| CA | 2 672 590 | | 10/2009 |
| CN | 1588521 | | 3/2005 |
| CN | 1601594 | A | 3/2005 |
| CN | 1886774 | | 12/2006 |
| CN | 101395653 | | 3/2009 |
| CN | 101908316 | A | 12/2010 |
| CN | 102656621 | A | 9/2012 |
| CN | 103562989 | A | 2/2014 |
| DE | 202006007613 | | 9/2006 |
| EP | 0 478 186 | | 4/1992 |
| EP | 1 028 471 | A | 8/2000 |
| EP | 1 130 565 | A1 | 9/2001 |
| EP | 1 194 013 | | 4/2002 |
| EP | 1 321 922 | | 6/2003 |
| EP | 1 335 430 | A1 | 8/2003 |
| EP | 1 381 019 | | 1/2004 |
| EP | 1 429 312 | A | 6/2004 |
| EP | 1 439 520 | A2 | 7/2004 |
| EP | 1 465 143 | A | 10/2004 |
| EP | 1 473 689 | A | 11/2004 |
| EP | 1 517 290 | A2 | 3/2005 |
| EP | 1 521 203 | A2 | 4/2005 |
| GB | 2 399 935 | | 9/2004 |
| GB | 2 460 018 | | 11/2009 |
| JP | 09 090405 | | 4/1997 |
| JP | 10-254410 | | 9/1998 |
| JP | 11 231805 | | 8/1999 |
| JP | 2002-278513 | | 9/2002 |
| JP | 2003-076331 | | 3/2003 |
| JP | 2003-099000 | | 4/2003 |
| JP | 2003-173165 | | 6/2003 |
| JP | 2003-186439 | | 7/2003 |
| JP | 2003-195809 | | 7/2003 |
| JP | 2003-271095 | | 9/2003 |
| JP | 2003-308046 | | 10/2003 |
| JP | 2004-054188 | | 2/2004 |
| JP | 2004-226960 | | 8/2004 |
| JP | 2005-004147 | | 1/2005 |
| JP | 2005-099715 | | 4/2005 |
| JP | 2005-258326 | | 9/2005 |
| JP | 2005-338819 | | 12/2005 |
| TW | 569173 | | 1/2004 |
| TW | 200526065 | | 8/2005 |
| TW | 1239501 | | 9/2005 |
| WO | WO 98/11554 | | 3/1998 |
| WO | WO 99/48079 | | 9/1999 |
| WO | WO 01/27910 | A1 | 4/2001 |
| WO | WO 02/067327 | A | 8/2002 |
| WO | WO 03/034389 | | 4/2003 |
| WO | WO 03/063124 | | 7/2003 |
| WO | WO 03/075256 | | 9/2003 |
| WO | WO 2004/003877 | | 1/2004 |
| WO | WO 2004/015668 | A1 | 2/2004 |
| WO | WO 2004/034364 | | 4/2004 |
| WO | WO 2005/022498 | | 3/2005 |
| WO | WO 2005/055185 | | 6/2005 |
| WO | WO 2005/055186 | A1 | 6/2005 |
| WO | WO 2005/069267 | | 7/2005 |
| WO | WO 2005/122121 | | 12/2005 |
| WO | WO 2006/063448 | | 6/2006 |
| WO | WO 2006/128069 | | 11/2006 |
| WO | WO 2007/079572 | | 7/2007 |
| WO | WO 2008/057369 | | 5/2008 |
| WO | WO 2009/059028 | | 5/2009 |
| WO | WO 2009/127065 | | 10/2009 |
| WO | WO 2010/066030 | | 6/2010 |
| WO | WO 2010/120733 | | 10/2010 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation Inspection and Process Diagnostics of AMOLED HDTV"; dated May 2010 (4 pages).

Ashtiani et al.: "AMOLED moled Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

Chaji et al.: "Merged phototransistor pixel with enhanced near infrared response and flicker noise reduction for biomolecular imaging"; dated Nov. 2008 (3 pages).

Chaji et al.: "Parallel Addressing Scheme for Voltage-Programmed Active-Matrix OLED Displays"; dated May 2007 (6 pages).

Chaji et al.: "Pseudo dynamic logic (SDL): a high-speed and low-power dynamic logic family"; dated 2002 (4 pages).

Chaji et al.: "Stable a-Si:H circuits based on short-term stress stability of amorphous silicon thin film transistors"; dated May 2006 (4 pages).

Chaji et al.: "Stable Pixel Circuit for Small-Area High- Resolution a-Si:H AMOLED Displays"; dated Oct. 2008 (6 pages).

Chaji et al.: "Stable RGBW AMOLED display with OLED degradation compensation using electrical feedback"; dated Feb. 2010 (2 pages).

(56) References Cited

OTHER PUBLICATIONS

Chaji et al.: "Thin-Film Transistor Integration for Biomedical Imaging and AMOLED Displays"; dated May 2008 (177 pages).
Chapter 3: Color Spaces"Keith Jack:" Video Demystified: "A Handbook for the Digital Engineer" 2001 Referex ORD-0000-00-00 USA EP040425529 ISBN: 1-878707-56-6 pp. 32-33.
Chapter 8: Alternative Flat Panel Display 1-25 Technologies; Willem den Boer: "Active Matrix Liquid Crystal Display: Fundamentals and Applications" 2005 Referex ORD-0000-00-00 U.K.; XP040426102 ISBN: 0-7506-7813-5 pp. 206-209 p. 208.
European Partial Search Report Application No. 12 15 6251.6 European Patent Office dated May 30, 2012 (7 pages).
European Patent Office Communication Application No. 05 82 1114 dated Jan. 11, 2013 (9 pages).
European Patent Office Communication with Supplemental European Search Report for EP Application No. 07 70 1644.2 dated Aug. 18, 2009 (12 pages).
European Search Report Application No. 10 83 4294.0-1903 dated Apr. 8, 2013 (9 pages).
European Search Report Application No. EP 05 80 7905 dated Apr. 2, 2009 (5 pages).
European Search Report Application No. EP 05 82 1114 dated Mar. 27, 2009 (2 pages).
European Search Report Application No. EP 07 70 1644 dated Aug. 5, 2009.
European Search Report Application No. EP 10 17 5764 dated Oct. 18, 2010 (2 pages).
European Search Report Application No. EP 10 82 9593.2 European Patent Office dated May 17, 2013 (7 pages).
European Search Report Application No. EP 12 15 6251.6 European Patent Office dated Oct. 12, 2012 (18 pages).
European Search Report Application No. EP. 11 175 225.9 dated Nov. 4, 2011 (9 pages).
European Supplementary Search Report Application No. EP 09 80 2309 dated May 8, 2011 (14 pages).
European Supplementary Search Report Application No. EP 09 83 1339.8 dated Mar. 26, 2012 (11 pages).
Extended European Search Report Application No. EP 06 75 2777.0 dated Dec. 6, 2010 (21 pages).
Extended European Search Report Application No. EP 09 73 2338.0 dated May 24, 2011 (8 pages).
Extended European Search Report Application No. EP 11 17 5223, 4 dated Nov. 8, 2011 (8 pages).
Extended European Search Report Application No. EP 12 17 4465.0 European Patent Office dated Sep. 7, 2012 (9 pages).
Fan et al. "LTPS_TFT Pixel Circuit Compensation for TFT Threshold Voltage Shift and IR-Drop on the Power Line for Amolded Displays" 5 pages copyright 2012.
Goh et al. "A New a-Si:H Thin-Film Transistor Pixel Circuit for Active-Matrix Organic Light-Emitting Diodes" IEEE Electron Device Letters vol. 24 No. 9 Sep. 2003 pp. 583-585.
International Search Report Application No. PCT/CA2005/001844 dated Mar. 28, 2006 (2 pages).
International Search Report Application No. PCT/CA2006/000941 dated Oct. 3, 2006 (2 pages).
International Search Report Application No. PCT/CA2007/000013 dated May 7, 2007.
International Search Report Application No. PCT/CA2009/001049 dated Dec. 7, 2009 (4 pages).
International Search Report Application No. PCT/CA2009/001769 dated Apr. 8, 2010.
International Search Report Application No. PCT/IB2010/002898 Canadian Intellectual Property Office dated Jul. 28, 2009 (5 pages).
International Search Report Application No. PCT/IB2010/055481 dated Apr. 7, 2011 (3 pages).
International Search Report Application No. PCT/IB2011/051103 dated Jul. 8, 2011 3 pages.
International Search Report Application No. PCT/IB2012/052651 5 pages dated Sep. 11, 2012.
International Searching Authority Written Opinion Application No. PCT/IB2010/055481 dated Apr. 7, 2011 (6 pages).
International Searching Authority Written Opinion Application No. PCT/IB2012/052651 6 pages dated Sep. 11, 2012.
International Searching Authority Written Opinion Application No. PCT/IB2011/051103 dated Jul. 8, 2011 6 pages.
International Searching Authority Written Opinion Application No. PCT/IB2010/002898 Canadian Intellectual Property Office dated Mar. 30, 2011 (8 pages).
International Searching Authority Written Opinion Application No. PCT/CA2009/001769 dated Apr. 8, 2010 (8 pages).
Jafarabadiashtiani et al.: "A New Driving Method for a-Si AMOLED Displays Based on Voltage Feedback"; dated May 2005 (4 pages).
Lee et al.: "Ambipolar Thin-Film Transistors Fabricated by PECVD Nanocrystalline Silicon"; dated May 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto Sep. 15-19, 1997 (6 pages).
Matsueda y et al.: "35.1: 2.5-in. AMOLED with Integrated 6-bit Gamma Compensated Digital Data Driver"; dated May 2004 (4 pages).
Nathan et al. "Amorphous Silicon Thin Film Transistor Circuit Integration for Organic LED Displays on Glass and Plastic" IEEE Journal of Solid-State Circuits vol. 39 No. 9 Sep. 2004 pp. 1477-1486.
Nathan et al.: "Backplane Requirements for Active Matrix Organic Light Emitting Diode Displays"; dated Sep. 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)"; dated Jun. 2006 (4 pages).
Nathan et al.: "Thin film imaging technology on glass and plastic"; dated Oct. 31-Nov. 2, 2000 (4 pages).
Ono et al. "Shared Pixel Compensation Circuit for AM-OLED Displays" Proceedings of the $9^{th}$ Asian Symposium on Information Display (ASID) pp. 462-465 New Delhi dated Oct. 8-12, 2006 (4 pages).
Philipp: "Charge transfer sensing" Sensor Review vol. 19 No. 2 Dec. 31, 1999 (Dec. 31, 1999) 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Smith, Lindsay I., "A tutorial on Principal Components Analysis," dated Feb. 26, 2001 (27 pages).
Stewart M. et al. "Polysilicon TFT technology for active matrix OLED displays" IEEE transactions on electron devices vol. 48 No. 5 May 2001 (7 pages).
Vygranenko et al.: "Stability of indium-oxide thin-film transistors by reactive ion beam assisted deposition"; dated Feb. 2009.

(56) References Cited

OTHER PUBLICATIONS

Wang et al.: "Indium oxides by reactive ion beam assisted evaporation: From material study to device application," dated Mar. 2009 (6 pages).
Yi He et al. "Current-Source a-Si:H Thin Film Transistor Circuit for Active-Matrix Organic Light-Emitting Displays" IEEE Electron Device Letters vol. 21 No. 12 Dec. 2000 pp. 590-592.
International Search Report Application No. PCT/IB2013/059074, dated Dec. 18, 2013 (5 pages).
International Searching Authority Written Opinion Application No. PCT/IB2013/059074, dated Dec. 18, 2013 (8 pages ).
Extended European Search Report Application No. EP 15173106.4 dated Oct. 15, 2013 (8 pages).
International Search Report and Written Opinion in International Application No. PCT/IB2013/060755, dated Apr. 15, 2014 (8 pages).
International Search Report Application No. PCT/IB2017/050170, dated May 5, 2017 (3 pages).
International Searching Authority Written Opinion Application No. PCT/IB2017/050170, dated May 5, 2017 (4 pages).

* cited by examiner

FIG. 3B
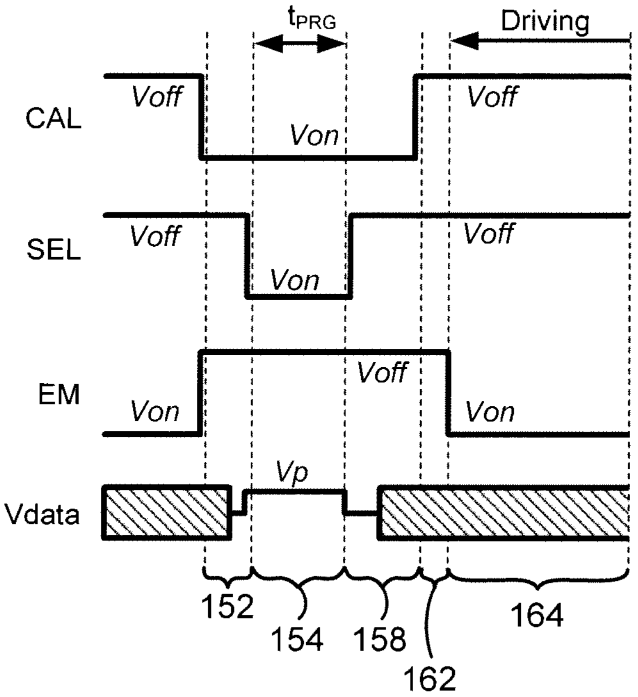
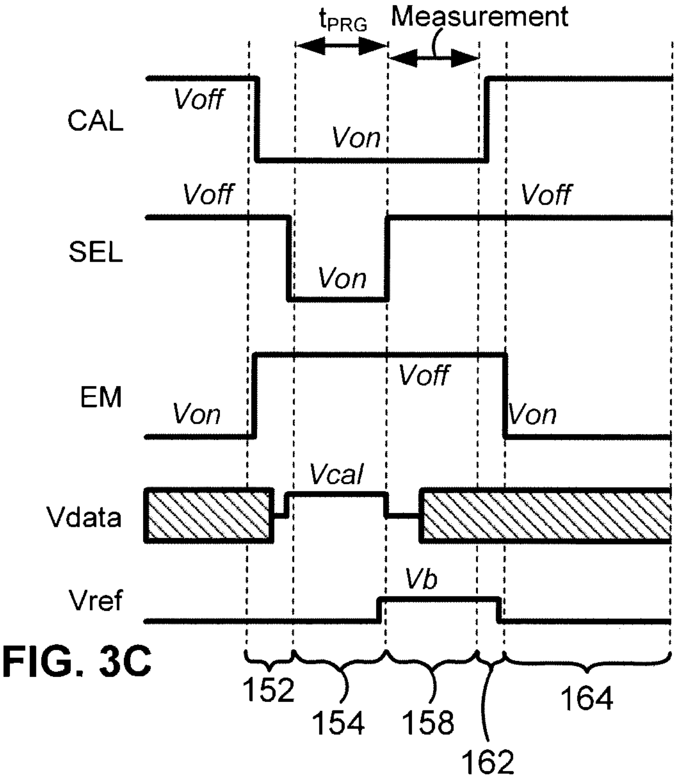
FIG. 3C

FIG. 16
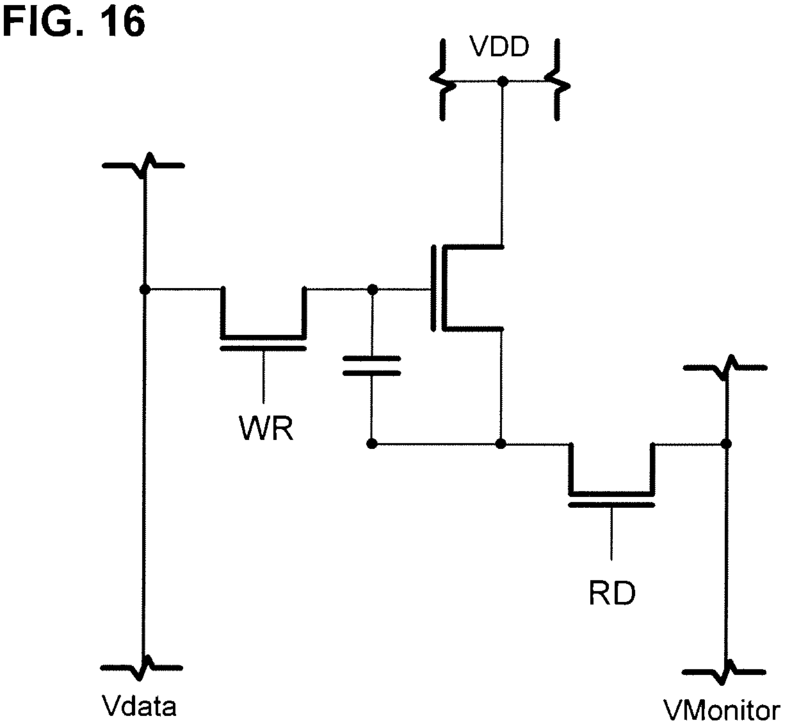
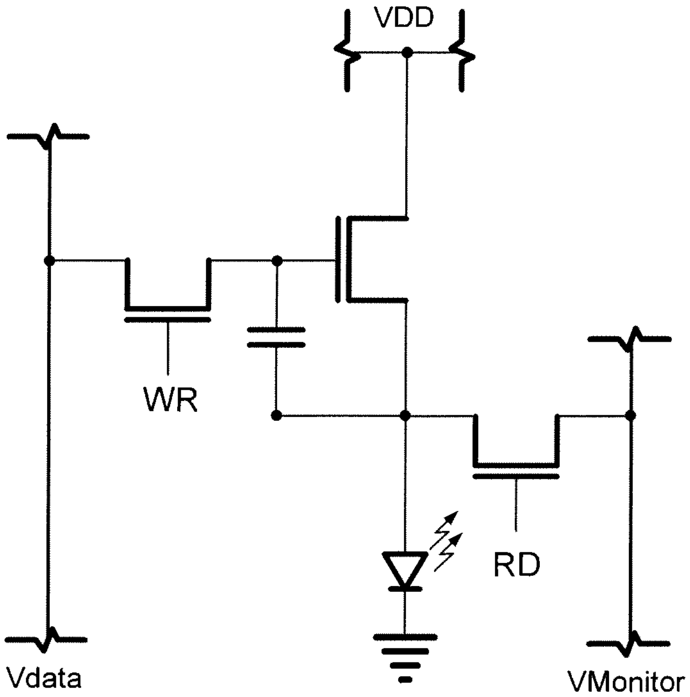
FIG. 17

PIXEL CIRCUITS FOR AMOLED DISPLAYS

CROSS REFERENCE TO RELATED APPLICATIONS

This application is a continuation of U.S. patent application Ser. No. 14/363,379, filed Jun. 6, 2014, now allowed, which is a U.S. National Stage of International Application No. PCT/IB2013/060755, filed Dec. 9, 2013, which claims the benefit of U.S. Provisional Application No. 61/815,698, filed Apr. 24, 2013; and PCT/IB2013/060755 is a continuation of U.S. patent application Ser. No. 13/710,872, filed Dec. 11, 2012, now U.S. Pat. No. 9,786,223, all of which are incorporated herein by reference in their entireties.

FIELD OF THE INVENTION

The present disclosure generally relates to circuits for use in displays, and methods of driving, calibrating, and programming displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

In accordance with one embodiment, a system for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a reference voltage source coupled to a first switching transistor that controls the coupling of the reference voltage source to the storage capacitor; a programming voltage source coupled to a second switching transistor that controls the coupling of the programming voltage to the gate of the drive transistor, so that the storage capacitor stores a voltage equal to the difference between the reference voltage and the programming voltage; and a controller configured to (1) supply a programming voltage that is a calibrated voltage for a known target current, (2) read the actual current passing through the drive transistor to a monitor line, (3) turn off the light emitting device while modifying the calibrated voltage to make the current supplied through the drive transistor substantially the same as the target current, (4) modify the calibrated voltage to make the current supplied through the drive transistor substantially the same as the target current, and (5) determine a current corresponding to the modified calibrated voltage based on predetermined current-voltage characteristics of the drive transistor.

Another embodiment provides a system for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a reference voltage source coupled to a first switching transistor that controls the coupling of the reference voltage source to the storage capacitor; a programming voltage source coupled to a second switching transistor that controls the coupling of the programming voltage to the gate of the drive transistor, so that the storage capacitor stores a voltage equal to the difference between the reference voltage and the programming voltage; and a controller configured to (1) supply a programming voltage that is a predetermined fixed voltage, (2) supply a current from an external source to the light emitting device, and (3) read the voltage at the node between the drive transistor and the light emitting device.

In a further embodiment, a system is provided for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a reference voltage source coupled to a first switching transistor that controls the coupling of the reference voltage source to the storage capacitor; a programming voltage source coupled to a second switching transistor that controls the coupling of the programming voltage to the gate of the drive transistor, so that the storage capacitor stores a voltage equal to the difference between the reference voltage and the programming voltage; and a controller configured to (1) supply a programming voltage that is an off voltage so that the drive transistor does not provide any current to the light emitting device, (2) supply a current from an external source to a node between the drive transistor and the light emitting device, the external source having a pre-calibrated voltage based on a known target current, (3) modify the pre-calibrated voltage to make the current substantially the same as the target current, (4) read the current corresponding to the modified calibrated voltage, and (5) determine a current corresponding to the modified calibrated voltage based on predetermined current-voltage characteristics of the OLED.

Yet another embodiment provides a system for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a reference voltage source coupled to a first switching transistor that controls the coupling of the reference voltage source to the storage capacitor; a programming voltage source coupled to a second switching transistor that controls the coupling of the programming voltage to the gate of the drive transistor, so that the storage capacitor stores a voltage equal to the difference between the reference voltage and the programming voltage; and a controller configured to (1) supply a current from an external source to the light emitting device, and (2) read the voltage at the node between the drive transistor and the light emitting device as the gate voltage of the drive transistor for the corresponding current.

A still further embodiment provides a system for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a supply voltage source coupled to a first switching transistor that controls the coupling of the supply voltage source to the storage capacitor and the drive transistor; a programming voltage source coupled to a second switching transistor that controls the coupling of the programming voltage to the gate of the drive transistor, so that the storage capacitor stores a voltage equal to the difference between the reference voltage and the programming voltage; a monitor line coupled to a third switching transistor that controls the coupling of the monitor line to a node between the light emitting device and the drive transistor; and a controller that (1) controls the programming voltage source to produce a voltage that is a calibrated voltage corresponding to a known target current through the drive transistor, (2) controls the monitor line to read a current through the monitor line, with a monitoring voltage low enough to prevent the light emitting device from turning on, (3) controls the programming voltage source to modify the calibrated voltage until the current through the drive transistor is substantially the same as the target current, and (4) identifies a current corresponding to the modified calibrated voltage in predetermined current-voltage characteristics of the drive transistor, the identified current corresponding to the current threshold voltage of the drive transistor.

Another embodiment provides a system for controlling an array of pixels in a display in which each pixel includes a pixel circuit that comprises a light-emitting device; a drive transistor for driving current through the light emitting device according to a driving voltage across the drive transistor during an emission cycle, the drive transistor having a gate, a source and a drain; a storage capacitor coupled to the gate of the drive transistor for controlling the driving voltage; a supply voltage source coupled to a first switching transistor that controls the coupling of the supply voltage source to the storage capacitor and the drive transistor; a programming voltage source coupled to a second switching transistor that controls the coupling of the programming voltage to the gate of the drive transistor, so that the storage capacitor stores a voltage equal to the difference between the reference voltage and the programming voltage; a monitor line coupled to a third switching transistor that controls the coupling of the monitor line to a node between the light emitting device and the drive transistor; and a controller that (1) controls the programming voltage source to produce an off voltage that prevents the drive transistor from passing current to the light emitting device, (2) controls the monitor line to supply a pre-calibrated voltage from the monitor line to a node between the drive transistor and the light emitting device, the pre-calibrated voltage causing current to flow through the node to the light emitting device, the pre-calibrated voltage corresponding to a predetermined target current through the drive transistor, (3) modifies the pre-calibrated voltage until the current flowing through the node to the light emitting device is substantially the same as the target current, and (4) identifies a current corresponding to the modified pre-calibrated voltage in predetermined current-voltage characteristics of the drive transistor, the identified current corresponding to the voltage of the light emitting device.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 3B is a timing diagram of first exemplary operation cycles for the pixel shown in FIG. 3A.

FIG. 3C is a timing diagram of second exemplary operation cycles for the pixel shown in FIG. 3A.

FIG. 16 is a circuit diagram of a pixel circuit for use in backplane testing.

FIG. 17 is a circuit diagram of a pixel circuit for a full display test.

Figure 1:
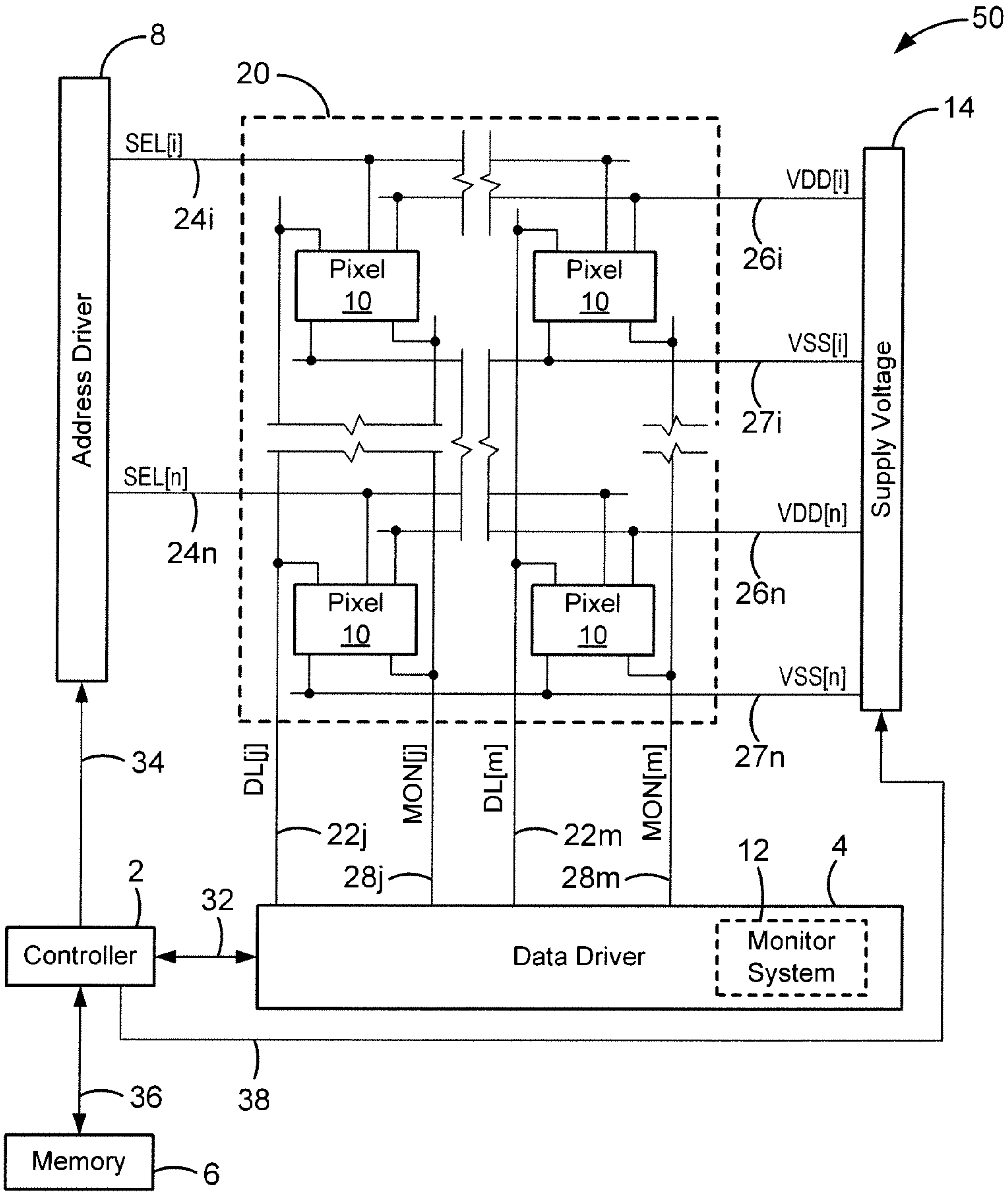
FIG. 1 illustrates an exemplary configuration of a system for driving an OLED display while monitoring the degradation of the individual pixels and providing compensation therefor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory storage 6, and display panel 20. The display panel 20 includes an array of pixels 10 arranged in rows and columns. Each of the pixels 10 are individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

The pixel 10 is operated by a driving circuit ("pixel circuit") that generally includes a drive transistor and a light emitting device. Hereinafter the pixel 10 may refer to the pixel circuit. The light emitting device can optionally be an organic light emitting diode, but implementations of the present disclosure apply to pixel circuits having other electroluminescence devices, including current-driven light emitting devices. The drive transistor in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit 10 can also include a storage capacitor for storing programming information and allowing the pixel circuit 10 to drive the light emitting device after being addressed. Thus, the display panel 20 can be an active matrix display array.

As illustrated in FIG. 1, the pixel 10 illustrated as the top-left pixel in the display panel 20 is coupled to a select line 24*j*, a supply line 26*j*, a data line 22*i*, and a monitor line 28*i*. In an implementation, the supply voltage 14 can also provide a second supply line to the pixel 10. For example, each pixel can be coupled to a first supply line charged with Vdd and a second supply line coupled with Vss, and the pixel circuits 10 can be situated between the first and second supply lines to facilitate driving current between the two supply lines during an emission phase of the pixel circuit. The top-left pixel 10 in the display panel 20 can correspond a pixel in the display panel in a "jth" row and "ith" column of the display panel 20. Similarly, the top-right pixel 10 in the display panel 20 represents a "jth" row and "mth" column; the bottom-left pixel 10 represents an "nth" row and "ith" column; and the bottom-right pixel 10 represents an "nth" row and "ith" column. Each of the pixels 10 is coupled to appropriate select lines (e.g., the select lines 24*j* and 24*n*), supply lines (e.g., the supply lines 26*j* and 26*n*), data lines (e.g., the data lines 22*i* and 22*m*), and monitor lines (e.g., the monitor lines 28*i* and 28*m*). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24*j* is provided by the address driver 8, and can be utilized to enable, for example, a programming operation of the pixel 10 by activating a switch or transistor to allow the data line 22*i* to program the pixel 10. The data line 22*i* conveys programming information from the data driver 4 to the pixel 10. For example, the data line 22*i* can be utilized to apply a programming voltage or a programming current to the pixel 10 in order to program the pixel 10 to emit a desired amount of luminance. The programming voltage (or programming current) supplied by the data driver 4 via the data line 22*i* is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device within the pixel 10, such as a storage capacitor, thereby enabling the pixel 10 to emit light with the desired amount of luminance during an emission operation following the programming operation. For example, the storage device in the pixel 10 can be charged during a programming operation to apply a voltage to one or more of a gate or a source terminal of the drive transistor during the emission operation, thereby causing the drive transistor to convey the driving current through the light emitting device according to the voltage stored on the storage device.

Generally, in the pixel 10, the driving current that is conveyed through the light emitting device by the drive transistor during the emission operation of the pixel 10 is a current that is supplied by the first supply line 26*j* and is drained to a second supply line (not shown). The first supply line 22*j* and the second supply line are coupled to the voltage supply 14. The first supply line 26*j* can provide a positive supply voltage (e.g., the voltage commonly referred to in circuit design as "Vdd") and the second supply line can provide a negative supply voltage (e.g., the voltage commonly referred to in circuit design as "Vss"). Implementations of the present disclosure can be realized where one or the other of the supply lines (e.g., the supply line 26*j*) are fixed at a ground voltage or at another reference voltage.

The display system 50 also includes a monitoring system 12. With reference again to the top left pixel 10 in the display panel 20, the monitor line 28*i* connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22*i* during a monitoring operation of the pixel 10, and the monitor line 28*i* can be entirely omitted. Additionally, the display system 50 can be implemented without the monitoring system 12 or the monitor line 28*i*. The monitor line 28*i* allows the monitoring system 12 to measure a current or voltage associated with the pixel 10 and thereby extract information indicative of a degradation of the pixel 10. For example, the monitoring system 12 can extract, via the monitor line 28*i*, a current flowing through the drive transistor within the pixel 10 and thereby determine, based on the measured current and based on the voltages applied to the drive transistor during the measurement, a threshold voltage of the drive transistor or a shift thereof.

The monitoring system 12 can also extract an operating voltage of the light emitting device (e.g., a voltage drop across the light emitting device while the light emitting device is operating to emit light). The monitoring system 12 can then communicate the signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via the memory signals 36, and the controller 2 then compensates for the extracted degradation information in subsequent programming and/or emission operations of the pixel 10. For example, once the degradation information is extracted, the programming information conveyed to the pixel 10 via the data line 22*i* can be appropriately adjusted during a subsequent programming operation of the pixel 10 such that the pixel 10 emits light with a desired amount of luminance that is independent of the degradation of the pixel 10. In an example, an increase in the threshold voltage of the drive transistor within the pixel 10 can be compensated for by appropriately increasing the programming voltage applied to the pixel 10.

Figure 2A:
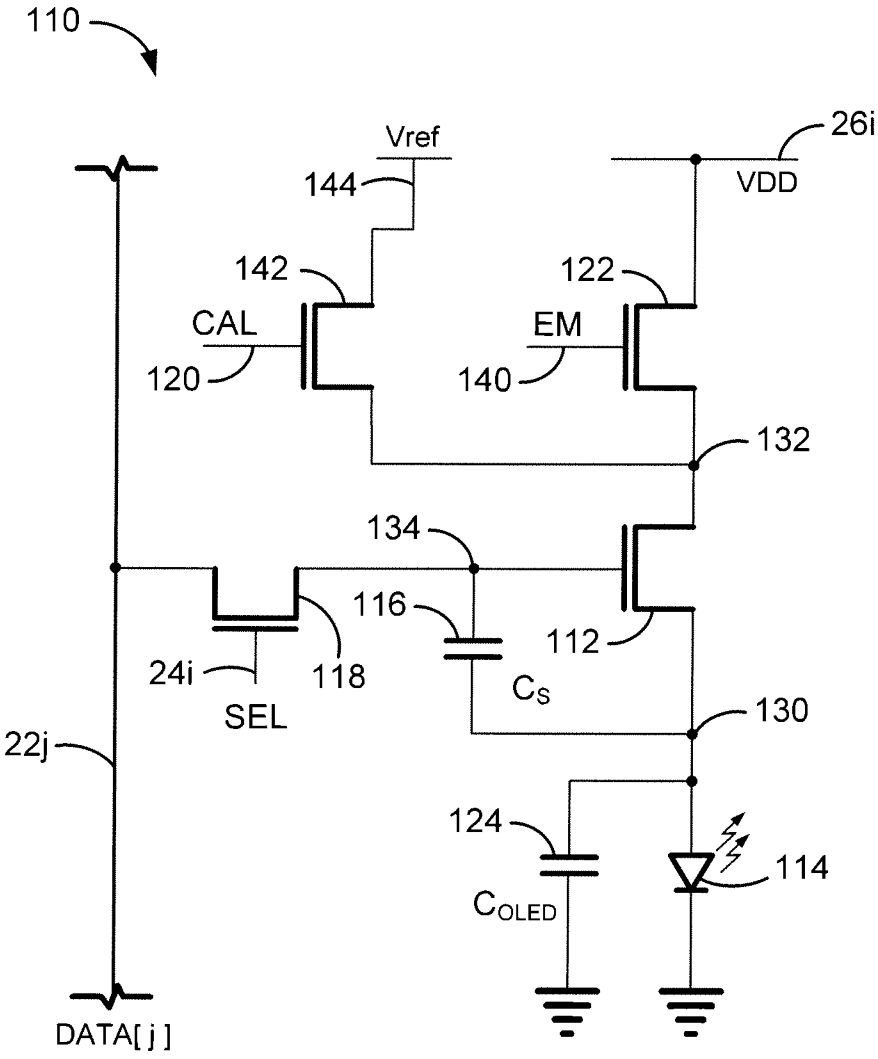
FIG. 2A is a circuit diagram of an exemplary pixel circuit configuration.

FIG. 2A is a circuit diagram of an exemplary driving circuit for a pixel 110. The driving circuit shown in FIG. 2A is utilized to calibrate, program, and drive the pixel 110 and includes a drive transistor 112 for conveying a driving current through an organic light emitting diode ("OLED") 114. The OLED 114 emits light according to the current passing through the OLED 114, and can be replaced by any current-driven light emitting device. The OLED 114 has an inherent capacitance 12. The pixel 110 can be utilized in the display panel 20 of the display system 50 described in connection with FIG. 1.

The driving circuit for the pixel 110 also includes a storage capacitor 116 and a switching transistor 118. The pixel 110 is coupled to a reference voltage line 144, a select line 24*i*, a voltage supply line 26*i*, and a data line 22*j*. The drive transistor 112 draws a current from the voltage supply line 26*i* according to a gate-source voltage (Vgs) across the gate and source terminals of the drive transistor 112. For example, in a saturation mode of the drive transistor 112, the current passing through the drive transistor can be given by $Ids=\beta(Vgs-Vt)^2$, where $\beta$ is a parameter that depends on device characteristics of the drive transistor 112, Ids is the current from the drain terminal of the drive transistor 112 to the source terminal of the drive transistor 112, and Vt is the threshold voltage of the drive transistor 112.

In the pixel 110, the storage capacitor 116 is coupled across the gate and source terminals of the drive transistor 112. The storage capacitor 116 has a first terminal 116*g*, which is referred to for convenience as a gate-side terminal 116*g*, and a second terminal 116*s*, which is referred to for convenience as a source-side terminal 116*s*. The gate-side terminal 116*g* of the storage capacitor 116 is electrically coupled to the gate terminal of the drive transistor 112. The source-side terminal 116*s* of the storage capacitor 116 is electrically coupled to the source terminal of the drive transistor 112. Thus, the gate-source voltage Vgs of the drive transistor 112 is also the voltage charged on the storage capacitor 116. As will be explained further below, the storage capacitor 116 can thereby maintain a driving voltage across the drive transistor 112 during an emission phase of the pixel 110.

The drain terminal of the drive transistor 112 is electrically coupled to the voltage supply line 26*i* through an emission transistor 160, and to the reference voltage line 144 through a calibration transistor 142. The source terminal of the drive transistor 112 is electrically coupled to an anode terminal of the OLED 114. A cathode terminal of the OLED 114 can be connected to ground or can optionally be connected to a second voltage supply line, such as a supply line Vss (not shown). Thus, the OLED 114 is connected in series with the current path of the drive transistor 112. The OLED 114 emits light according to the magnitude of the current passing through the OLED 114, once a voltage drop across the anode and cathode terminals of the OLED achieves an operating voltage ($V_{OLED}$) of the OLED 114. That is, when the difference between the voltage on the anode terminal and the voltage on the cathode terminal is greater than the operating voltage $V_{OLED}$, the OLED 114 turns on and emits light. When the anode to cathode voltage is less than $V_{OLED}$, current does not pass through the OLED 114.

The switching transistor 118 is operated according to a select line 24*i* (e.g., when the voltage SEL on the select line 24*i* is at a high level, the switching transistor 118 is turned on, and when the voltage SEL is at a low level, the switching transistor is turned off). When turned on, the switching transistor 118 electrically couples the gate terminal of the drive transistor (and the gate-side terminal 116*g* of the storage capacitor 116) to the data line 22*j*.

The drain terminal of the drive transistor 112 is coupled to the VDD line 26*i* via an emission transistor 122, and to a Vref line 144 via a calibration transistor 142. The emission transistor 122 is controlled by the voltage on an EM line 140 connected to the gate of the transistor 122, and the calibration transistor 142 is controlled by the voltage on a CAL line 140 connected to the gate of the transistor 142. As will be described further below in connection with FIG. 2B, the reference voltage line 144 can be maintained at a ground voltage or another fixed reference voltage (Vref) and can optionally be adjusted during a programming phase of the pixel 110 to provide compensation for degradation of the pixel 110.

Figure 2B:
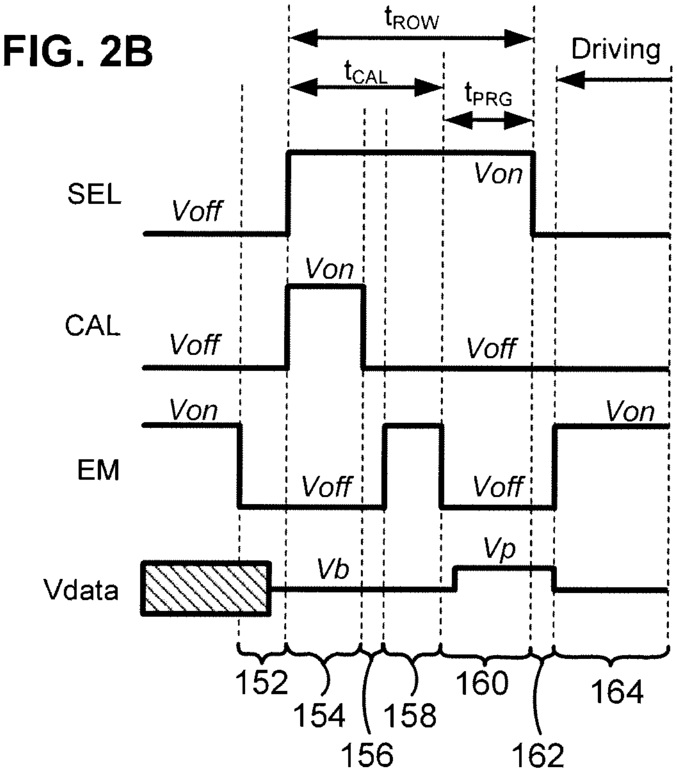
FIG. 2B is a timing diagram of first exemplary operation cycles for the pixel shown in FIG. 2A.

FIG. 2B is a schematic timing diagram of exemplary operation cycles for the pixel 110 shown in FIG. 2A. The pixel 110 can be operated in a calibration cycle $t_{CAL}$ having two phases 154 and 158 separated by an interval 156, a program cycle 160, and a driving cycle 164. During the first phase 154 of the calibration cycle, both the SEL line and the CAL lines are high, so the corresponding transistors 118 and 142 are turned on. The calibration transistor 142 applies the voltage Vref, which has a level that turns the OLED 114 off, to the node 132 between the source of the emission transistor 122 and the drain of the drive transistor 112. The switching transistor 118 applies the voltage Vdata, which is at a biasing voltage level Vb, to the gate of the drive transistor 112 to allow the voltage Vref to be transferred from the node 132 to the node 130 between the source of the drive transistor 112 and the anode of the OLED 114. The voltage on the CAL line goes low at the end of the first phase 154, while the voltage on the SEL line remains high to keep the drive transistor 112 turned on.

During the second phase 158 of the calibration cycle $t_{CAL}$, the voltage on the EM line 140 goes high to turn on the emission transistor 122, which causes the voltage at the node 130 to increase. If the phase 158 is long enough, the voltage at the node 130 reaches a value (Vb−Vt), where Vt is the threshold voltage of the drive transistor 112. If the phase 158 is not long enough to allow that value to be reached, the voltage at the node 130 is a function of Vt and the mobility of the drive transistor 112. This is the voltage stored in the capacitor 116.

The voltage at the node 130 is applied to the anode terminal of the OLED 114, but the value of that voltage is chosen such that the voltage applied across the anode and cathode terminals of the OLED 114 is less than the operating voltage $V_{OLED}$ of the OLED 114, so that the OLED 114 does not draw current. Thus, the current flowing through the drive transistor 112 during the calibration phase 158 does not pass through the OLED 114.

During the programming cycle 160, the voltages on both lines EM and CAL are low, so both the emission transistor 122 and the calibration transistor 142 are off. The SEL line remains high to turn on the switching transistor 116, and the data line 22*j* is set to a programming voltage Vp, thereby charging the node 134, and thus the gate of the drive transistor 112, to Vp. The node 130 between the OLED and the source of the drive transistor 112 holds the voltage created during the calibration cycle, since the OLED capacitance is large. The voltage charged on the storage capacitor 116 is the difference between Vp and the voltage created during the calibration cycle. Because the emission transistor 122 is off during the programming cycle, the charge on the capacitor 116 cannot be affected by changes in the voltage level on the Vdd line 26*i*.

During the driving cycle 164, the voltage on the EM line goes high, thereby turning on the emission transistor 122, while both the switching transistor 118 and the and the calibration transistor 142 remain off. Turning on the emission transistor 122 causes the drive transistor 112 to draw a driving current from the VDD supply line 26*i*, according to the driving voltage on the storage capacitor 116. The OLED 114 is turned on, and the voltage at the anode of the OLED adjusts to the operating voltage $V_{OLED}$. Since the voltage stored in the storage capacitor 116 is a function of the threshold voltage Vt and the mobility of the drive transistor 112, the current passing through the OLED 114 remains stable.

The SEL line 24*i* is low during the driving cycle, so the switching transistor 118 remains turned off. The storage capacitor 116 maintains the driving voltage, and the drive transistor 112 draws a driving current from the voltage supply line 26*i* according to the value of the driving voltage on the capacitor 116. The driving current is conveyed through the OLED 114, which emits a desired amount of light according to the amount of current passed through the OLED 114. The storage capacitor 116 maintains the driving voltage by self-adjusting the voltage of the source terminal and/or gate terminal of the drive transistor 112 so as to account for variations on one or the other. For example, if the voltage on the source-side terminal of the capacitor 116 changes during the driving cycle 164 due to, for example, the anode terminal of the OLED 114 settling at the operating voltage $V_{OLED}$, the storage capacitor 116 adjusts the voltage on the gate terminal of the drive transistor 112 to maintain the driving voltage across the gate and source terminals of the drive transistor.

Figure 2C:
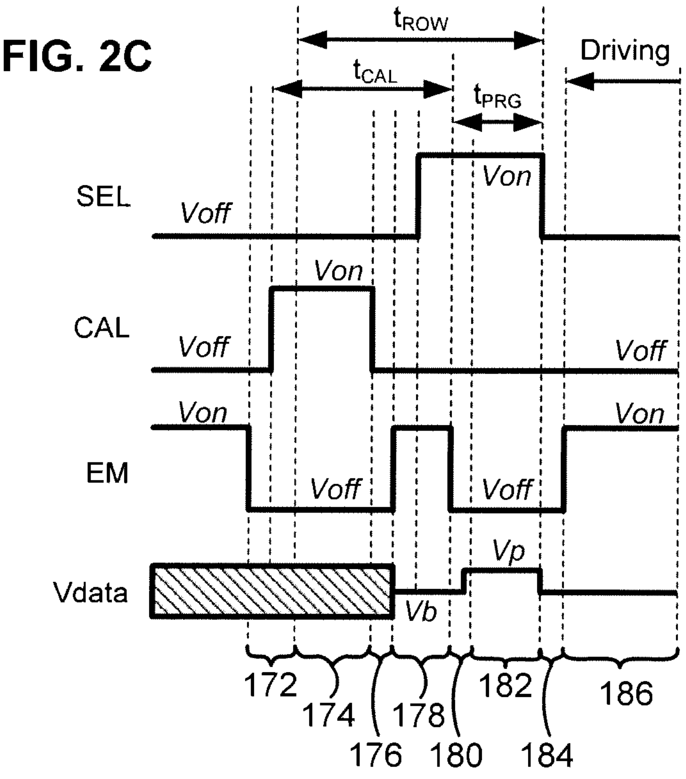
FIG. 2C is a timing diagram of second exemplary operation cycles for the pixel shown in FIG. 2A.

FIG. 2C is a modified timing diagram in which the voltage on the data line 22*j* is used to charge the node 130 to Vref during a longer first phase 174 of the calibration cycle $t_{CAL}$. This makes the CAL signal the same as the SEL signal for the previous row of pixels, so the previous SEL signal (SEL[n−1]) can be used as the CAL signal for the nth row.

While the driving circuit illustrated in FIG. 2A is illustrated with n-type transistors, which can be thin-film transistors and can be formed from amorphous silicon, the driving circuit illustrated in FIG. 2A and the operating cycles illustrated in FIG. 2B can be extended to a complementary circuit having one or more p-type transistors and having transistors other than thin film transistors.

Figure 3A:
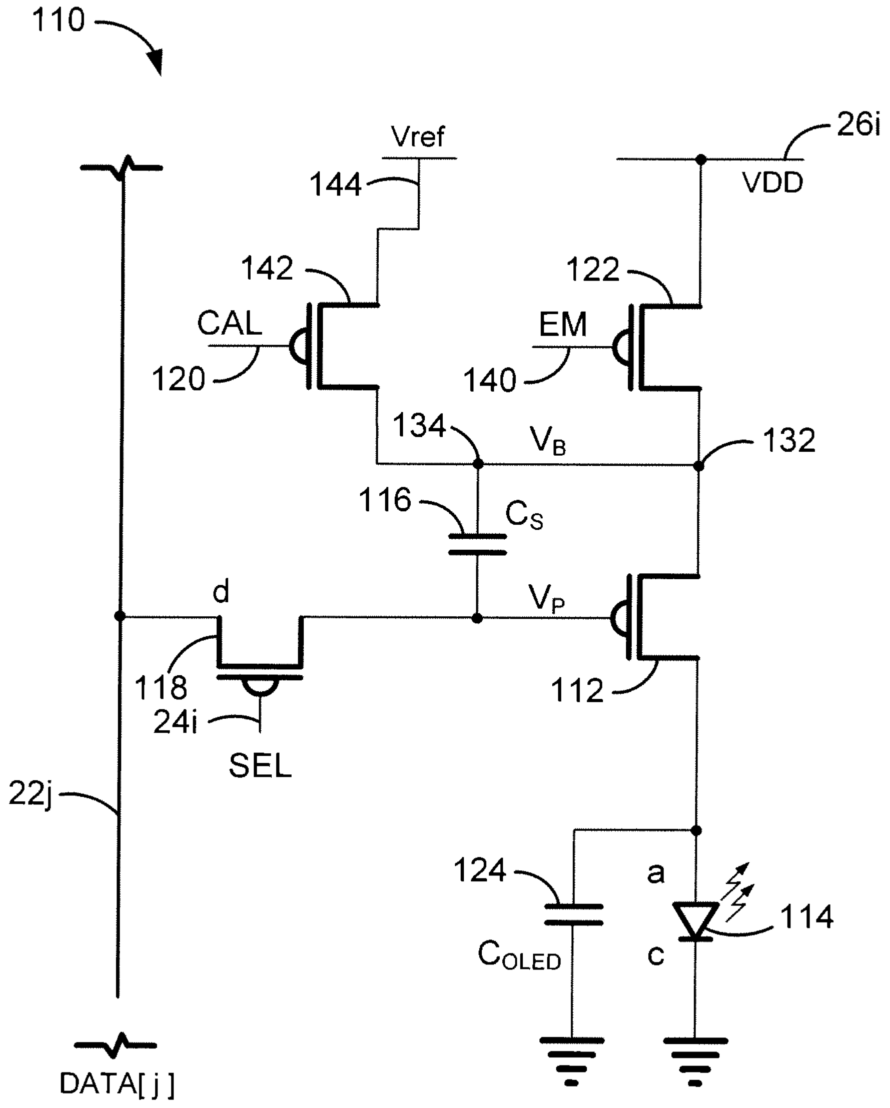
FIG. 3A is a circuit diagram of an exemplary pixel circuit configuration.

FIG. 3A is a modified version of the driving circuit of FIG. 2A using p-type transistors, with the storage capacitor 116 connected between the gate and source terminals of the drive transistor 112. As can be seen in the timing diagram in FIG. 3B, the emission transistor 122 disconnects the pixel 110 in FIG. 3A from the VDD line during the programming cycle 154, to avoid any effect of VDD variations on the pixel current. The calibration transistor 142 is turned on by the CAL line 120 during the programming cycle 154, which applies the voltage Vref to the node 132 on one side of the capacitor 116, while the switching transistor 118 is turned on by the SEL line to apply the programming voltage Vp to the node 134 on the opposite side of the capacitor. Thus, the voltage stored in the storage capacitor 116 during programming in FIG. 3A will be (Vp−Vref). Since there is small current flowing in the Vref line, the voltage is stable. During the driving cycle 164, the VDD line is connected to the pixel, but it has no effect on the voltage stored in the capacitor 116 since the switching transistor 118 is off during the driving cycle.

FIG. 3C is a timing diagram illustrating how TFT transistor and OLED readouts are obtained in the circuit of FIG. 3A. For a TFT readout, the voltage Vcal on the DATA line 22*j* during the programming cycle 154 should be a voltage related to the desired current. For an OLED readout, during the measurement cycle 158 the voltage Vcal is sufficiently low to force the drive transistor 112 to act as a switch, and the voltage Vb on the Vref line 144 and node 132 is related to the OLED voltage. Thus, the TFT and OLED readouts can be obtained from the DATA line 120 and the node 132, respectively, during different cycles.

Figure 4A:
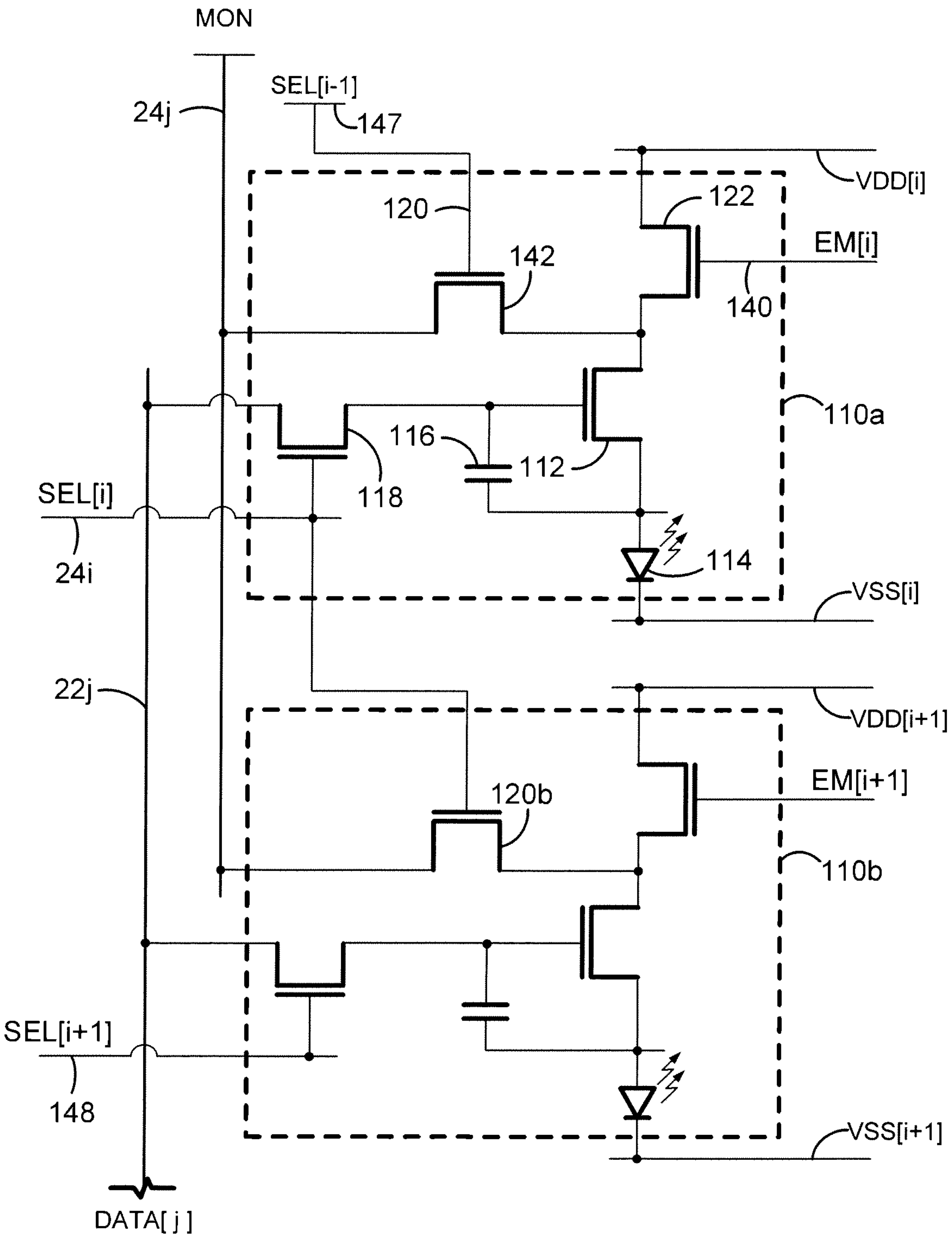
FIG. 4A is a circuit diagram of an exemplary pixel circuit configuration.

FIG. 4A is a circuit diagram showing how two of the FIG. 2A pixels located in the same column j and in adjacent rows I and i+1 of a display can be connected to three SEL lines SEL[i−1], SEL[i] and SEL[i+1], two VDD lines VDD[i] and VDD[i+1], two EM lines EM[i] and EM[i+1], two VSS lines VSS[i] and VSS[i+1], a common Vref2/MON line 24*j* and a common DATA line 22*j*. Each column of pixels has its own DATA and Vref2/MON lines that are shared by all the pixels in that column. Each row of pixels has its own VDD, VSS, EM and SEL lines that are shared by all the pixels in that row. In addition, the calibration transistor 142 of each pixel has its gate connected to the SEL line of the previous row (SEL[i−1]). This is an efficient arrangement when external compensation is provided for the OLED efficiency as the display ages, while in-pixel compensation is used for other parameters such as $V_{OLED}$, temperature-induced degradation, IR drop (e.g., in the VDD lines), hysteresis, etc.

Figure 4B:
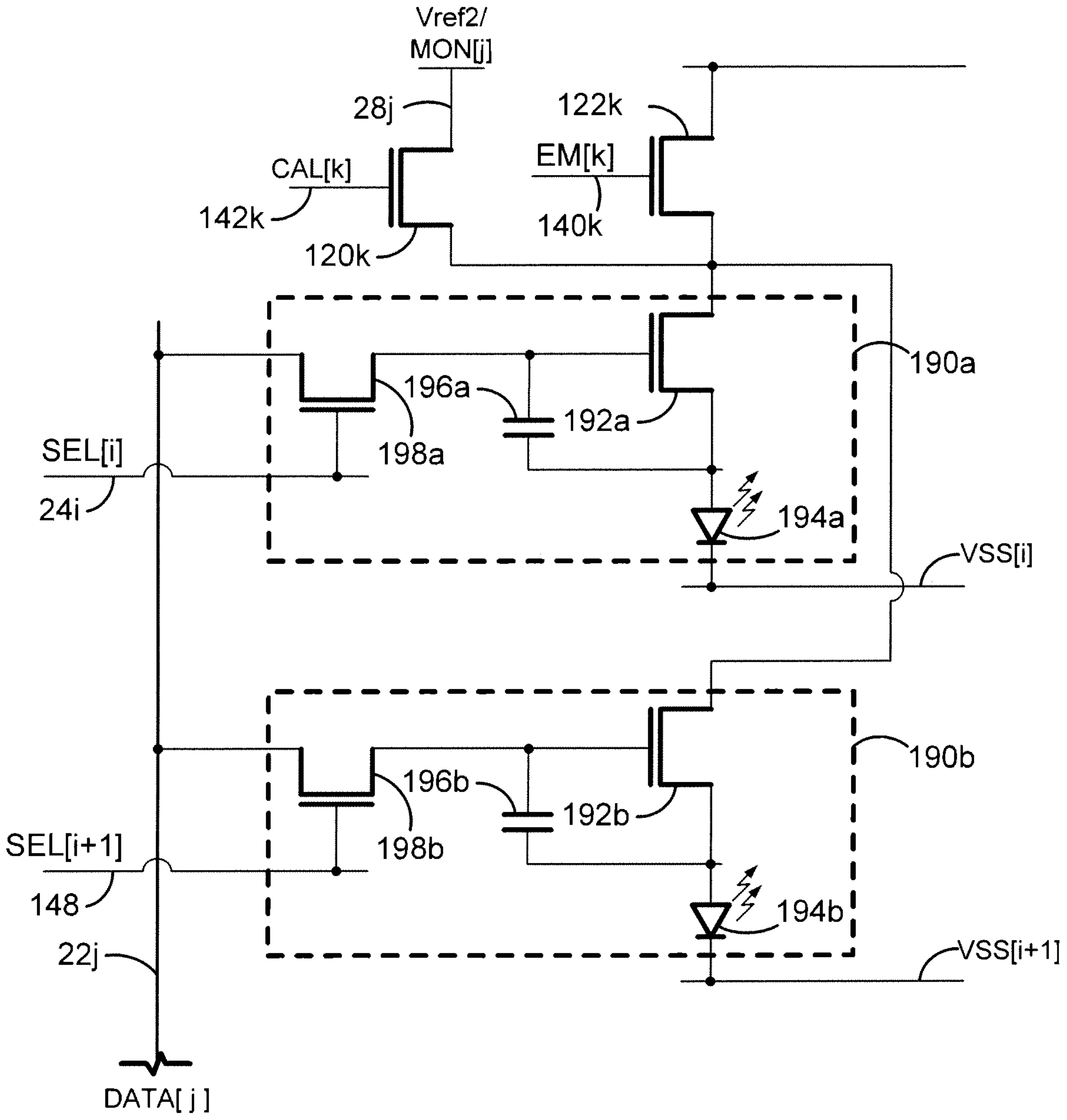
FIG. 4B is a circuit diagram of a modified configuration for two identical pixel circuits in a display.

FIG. 4B is a circuit diagram showing how the two pixels shown in FIG. 4A can be simplified by sharing common calibration and emission transistors 120 and 140 and common Vref2/MON and VDD lines. It can be seen that the number of transistors required is significantly reduced.

Figure 5A:
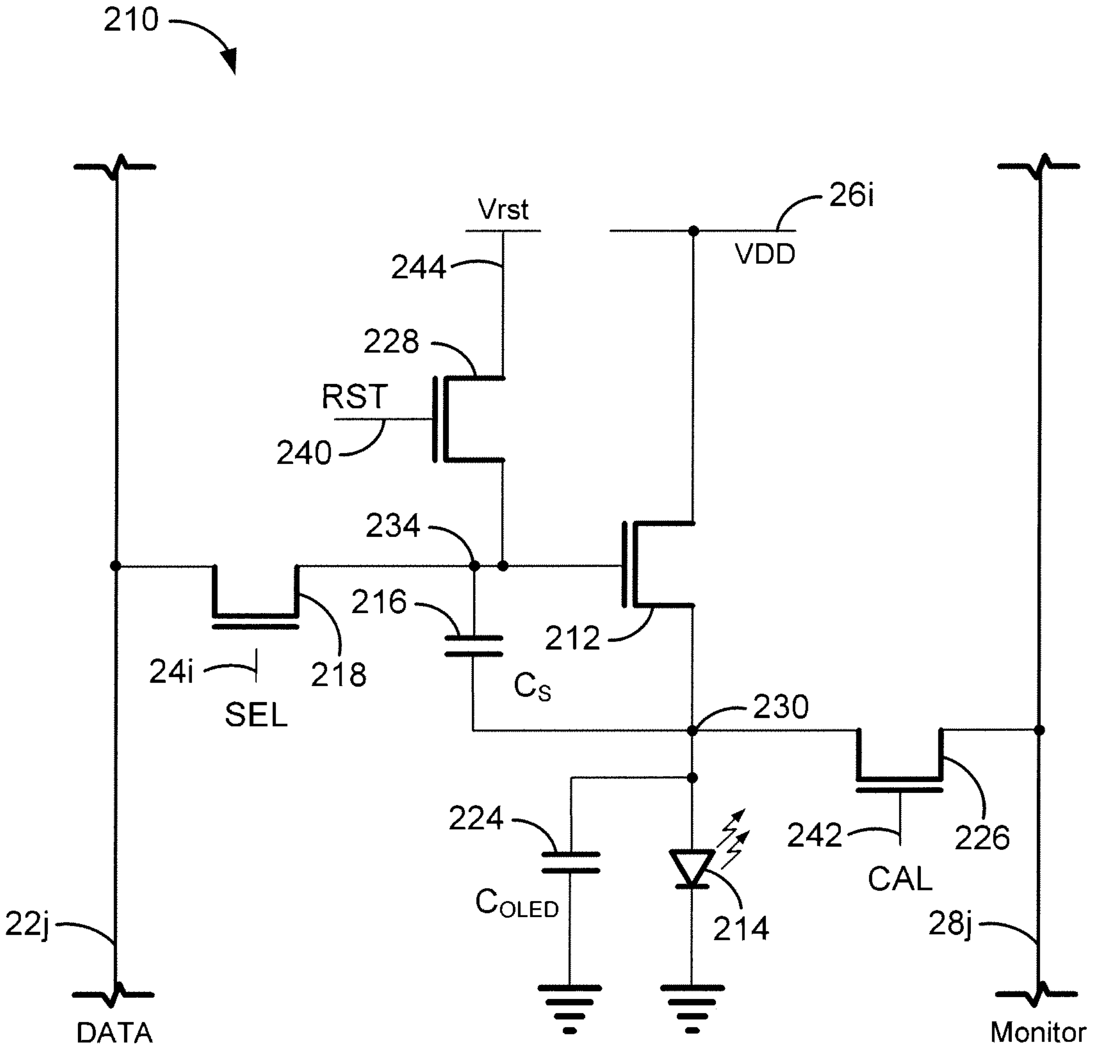
FIG. 5A is a circuit diagram of an exemplary pixel circuit configuration.

FIG. 5A is a circuit diagram of an exemplary driving circuit for a pixel 210 that includes a monitor line 28*j* coupled to the node 230 by a calibration transistor 226 controlled by a CAL line 242, for reading the current values of operating parameters such as the drive current and the OLED voltage. The circuit of FIG. 5A also includes a reset transistor 228 for controlling the application of a reset voltage Vrst to the gate of the drive transistor 212. The drive transistor 212, the switching transistor 218 and the OLED 214 are the same as described above in the circuit of FIG. 2A.

Figure 5B:
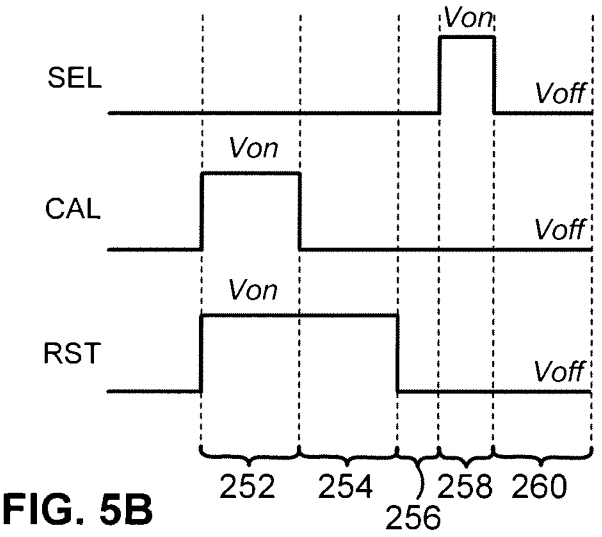
FIG. 5B is a timing diagram of first exemplary operation cycles for the pixel illustrated in FIG. 5A.

FIG. 5B is a schematic timing diagram of exemplary operation cycles for the pixel 210 shown in FIG. 5A. At the beginning of the cycle 252, the RST and CAL lines go high at the same time, thereby turning on both the transistors 228 and 226 for the cycle 252, so that a voltage is applied to the monitor line 28*j*. The drive transistor 212 is on, and the OLED 214 is off. During the next cycle 254, the RST line stays high while the CAL line goes low to turn off the transistor 226, so that the drive transistor 212 charges the node 230 until the drive transistor 212 is turned off, e.g., by the RST line going low at the end of the cycle 254. At this point the gate-source voltage Vgs of the drive transistor 212 is the Vt of that transistor. If desired, the timing can be selected so that the drive transistor 212 does not turn off during the cycle 254, but rather charges the node 230 slightly. This charge voltage is a function of the mobility, Vt and other parameters of the transistor 212 and thus can compensate for all these parameters.

During the programming cycle 258, the SEL line 24*i* goes high to turn on the switching transistor 218. This connects the gate of the drive transistor 212 to the DATA line, which charges the the gate of transistor 212 to Vp. The gate-source voltage Vgs of the transistor 212 is then Vp+Vt, and thus the current through that transistor is independent of the threshold voltage Vt:

$$
\begin{aligned}
I &= (Vgs - Vt)^2 \\
&= (Vp + Vt - Vt)^2 \\
&= Vp^2
\end{aligned}
$$

Figure 5C:
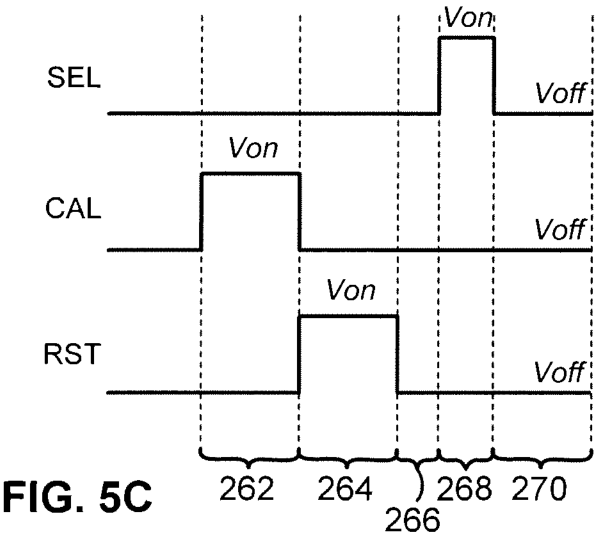
FIG. 5C is a timing diagram of second exemplary operation cycles for the pixel illustrated in FIG. 5A.
Figure 5D:
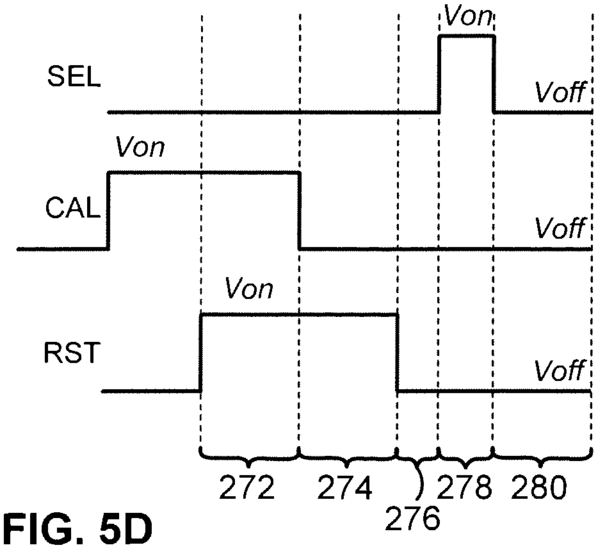
FIG. 5D is a timing diagram of third exemplary operation cycles for the pixel illustrated in FIG. 5A.

The timing diagrams in FIGS. 5C and 5D as described above for the timing diagram of FIG. 5B, but with symmetric signals for CAL and RST so they can be shared, e.g., CAL[n] can be used as RST[n−1].

Figure 5E:
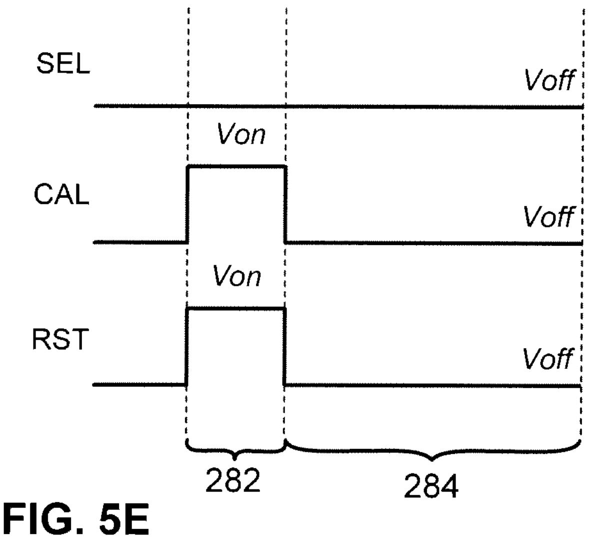
FIG. 5E is a timing diagram of fourth exemplary operation cycles for the pixel illustrated in FIG. 5A.

FIG. 5E illustrates a timing diagram that permits the measuring of the OLED voltage and/or current through the monitor line 28*j* while the RST line is high to turn on the transistor 228, during the cycle 282, while the drive transistor 212 is off.

Figure 5F:
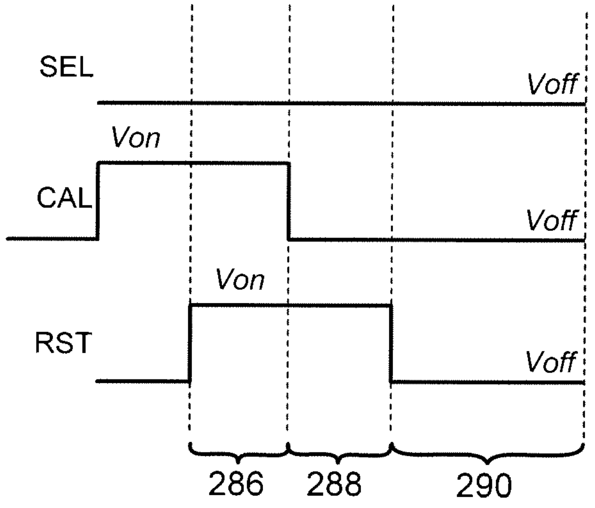
FIG. 5F is a timing diagram of fifth exemplary operation cycles for the pixel illustrated in FIG. 5A.

FIG. 5F illustrates a timing diagram that offers functionality similar to that of FIG. 5E. However, with the timing shown in FIG. 5F, each pixel in a given row n can use the reset signal from the previous row n−1 (RST[n−1]) as the calibration signal CAL[n] in the current row n, thereby reducing the number of signals required.

Figure 6A:
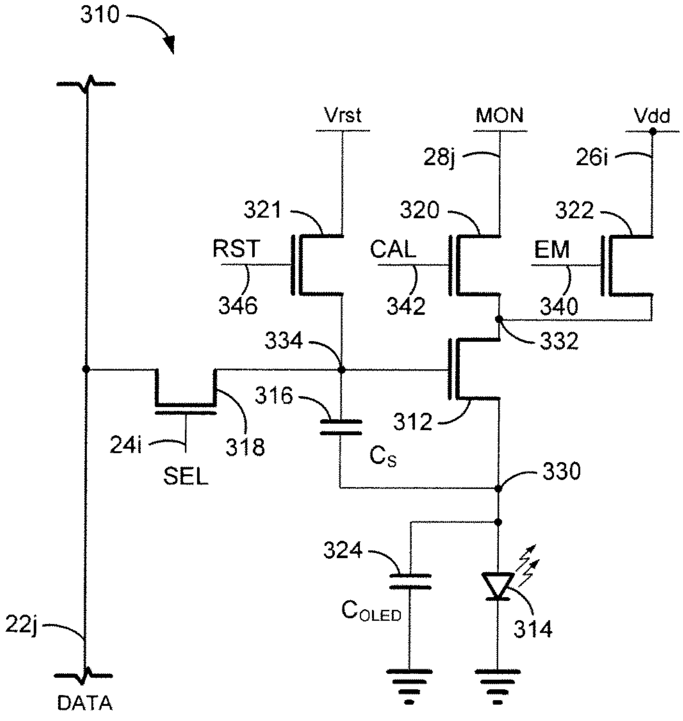
FIG. 6A is a circuit diagram of an exemplary pixel circuit configuration.

FIG. 6A is a circuit diagram of an exemplary driving circuit for a pixel 310 that includes a calibration transistor 320 between the drain of the drive transistor 312 and a MON/Vref2 line 28*j* for controlling the application of a voltage Vref2 to the node 332, which is the drain of the drive transistor 312. The circuit in FIG. 6A also includes an emission transistor 322 between the drain of the drive transistor 312 and a VDD line 26*i*, for controlling the application of the voltage Vdd to the node 332. The drive transistor 312, the switching transistor 318, the reset transistor 321 and the OLED 214 are the same as described above in the circuit of FIG. 5A.

Figure 6B:
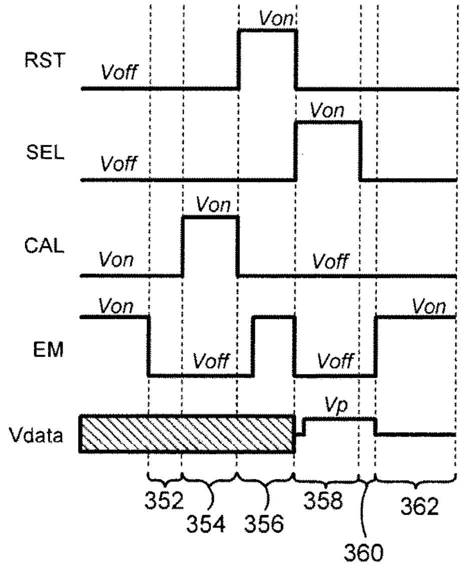
FIG. 6B is a timing diagram of exemplary operation cycles for the pixel illustrated in FIG. 6A.

FIG. 6B is a schematic timing diagram of exemplary operation cycles for the pixel 310 shown in FIG. 6A. At the beginning of the cycle 352, the EM line goes low to turn off the emission transistor 322 so that the voltage Vdd is not applied to the drain of the drive transistor 312. The emission transistor remains off during the second cycle 354, when the CAL line goes high to turn on the calibration transistor 320, which connects the MON/Vref2 line 28*j* to the node 332. This charges the node 332 to a voltage that is smaller that the ON voltage of the OLED. At the end of the cycle 354, the CAL line goes low to turn off the calibration transistor 320. Then during the next cycle 356, and the RST and EM successively go high to turn on transistors 321 and 322, respectively, to connect (1) the Vrst line to a node 334, which is the gate terminal of the storage capacitor 316 and (2) the VDD line 26*i* to the node 332. This turns on the drive transistor 312 to charge the node 330 to a voltage that is a function of Vt and other parameters of the drive transistor 312.

At the beginning of the next cycle 358 shown in FIG. 6B, the RST and EM lines go low to turn off the transistors 321 and 322, and then the SEL line goes high to turn on the switching transistor 318 to supply a programming voltage Vp to the gate of the drive transistor 312. The node 330 at the source terminal of the drive transistor 312 remains substantially the same because the capacitance $C_{OLED}$ of the OLED 314 is large. Thus, the gate-source voltage of the transistor 312 is a function of the mobility, Vt and other parameters of the drive transistor 312 and thus can compensate for all these parameters.

Figure 7A:
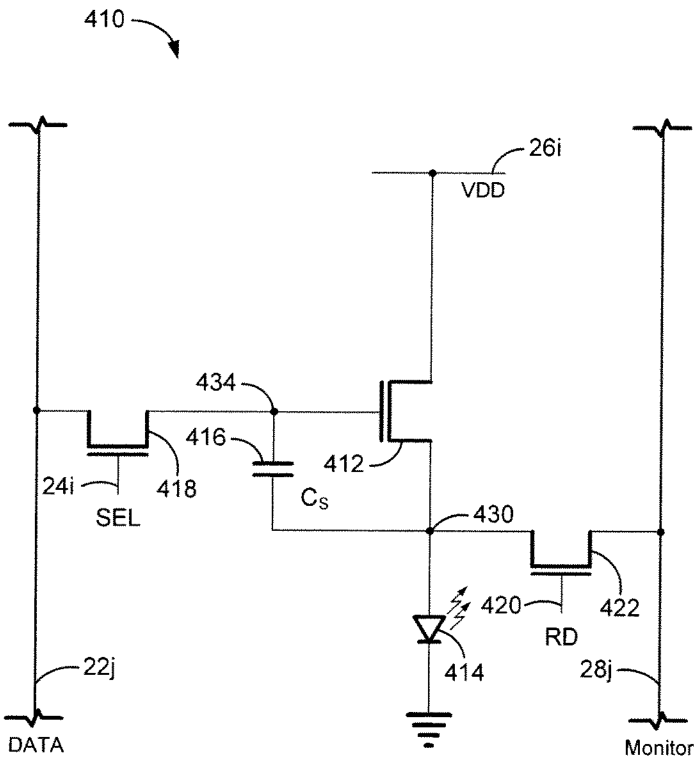
FIG. 7A is a circuit diagram of an exemplary pixel circuit configuration.

FIG. 7A is a circuit diagram of another exemplary driving circuit that modifies the gate-source voltage Vgs of the drive transistor 412 of a pixel 410 to compensate for variations in drive transistor parameters due to process variations, aging and/or temperature variations. This circuit includes a monitor line 28*j* coupled to the node 430 by a read transistor 422 controlled by a RD line 420, for reading the current values of operating parameters such as drive current and Voled. The drive transistor 412, the switching transistor 418 and the OLED 414 are the same as described above in the circuit of FIG. 2A.

Figure 7B:
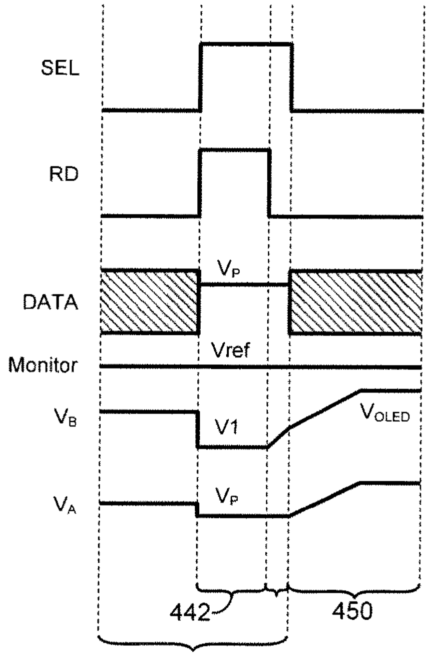
FIG. 7B is a timing diagram of exemplary operation cycles for the pixel illustrated in FIG. 7A.

FIG. 7B is a schematic timing diagram of exemplary operation cycles for the pixel 410 shown in FIG. 7A. At the beginning of the first phase 442 of a programming cycle 446, the SEL and RD lines both go high to (1) turn on a switching transistor 418 to charge the gate of the drive transistor 412 to a programming voltage Vp from the data line 22*j*, and (2) turn on a read transistor 422 to charge the source of the transistor 412 (node 430) to a voltage Vref from a monitor line 28*j*. During the second phase 444 of the programming cycle 446, the RD line goes low to turn off the read transistor 422 so that the node 430 is charged back through the transistor 412, which remains on because the SEL line remains high. Thus, the gate-source voltage of the transistor 312 is a function of the mobility, Vt and other parameters of the transistor 212 and thus can compensate for all these parameters.

Figure 8A:
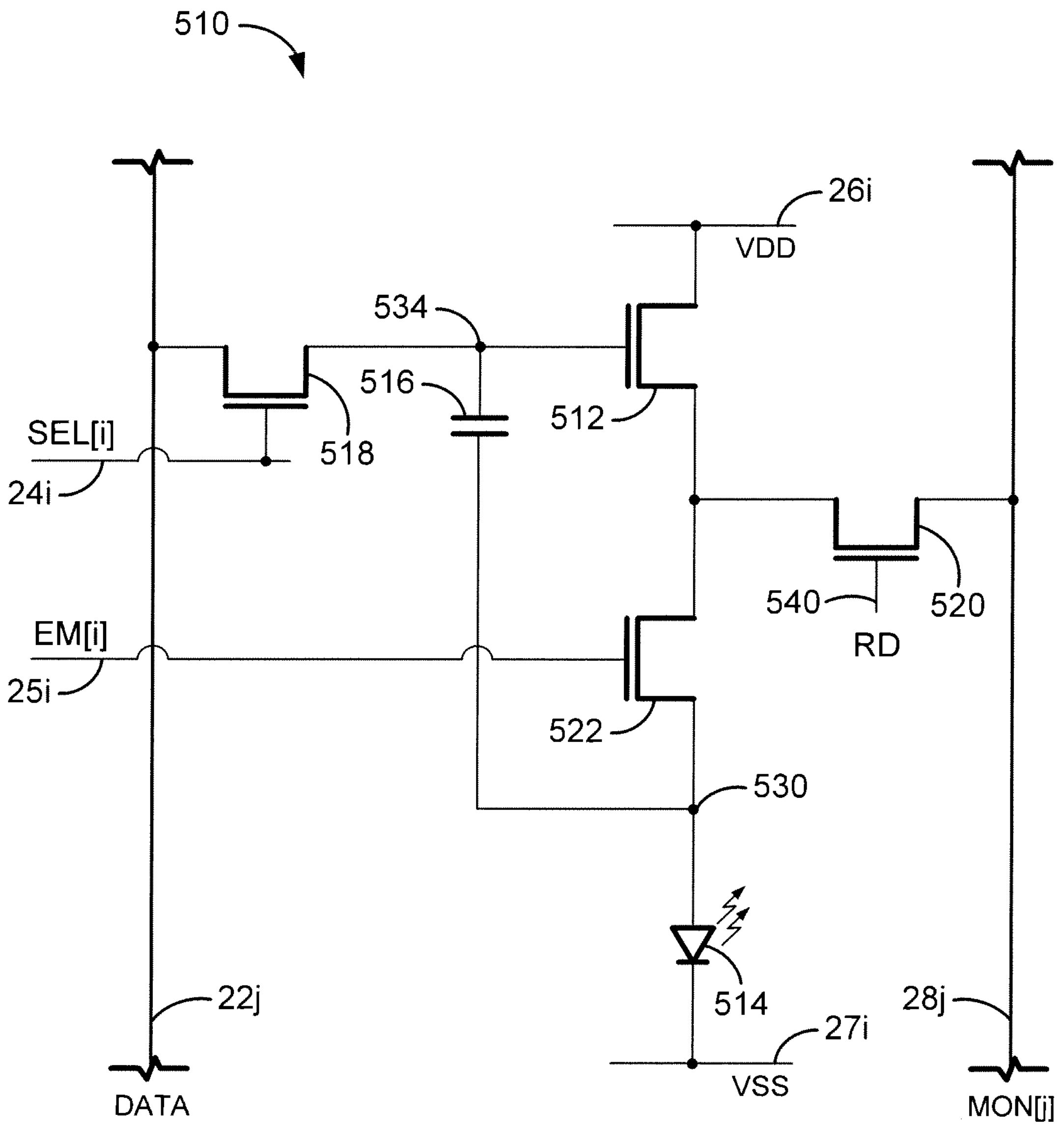
FIG. 8A is a circuit diagram of an exemplary pixel circuit configuration.

FIG. 8A is a circuit diagram of an exemplary driving circuit for a pixel 510 which adds an emission transistor 522 to the pixel circuit of FIG. 7A, between the source side of the storage capacitor 522 and the source of the drive transistor 512. The drive transistor 512, the switching transistor 518, the read transistor 520, and the OLED 414 are the same as described above in the circuit of FIG. 7A.

Figure 8B:
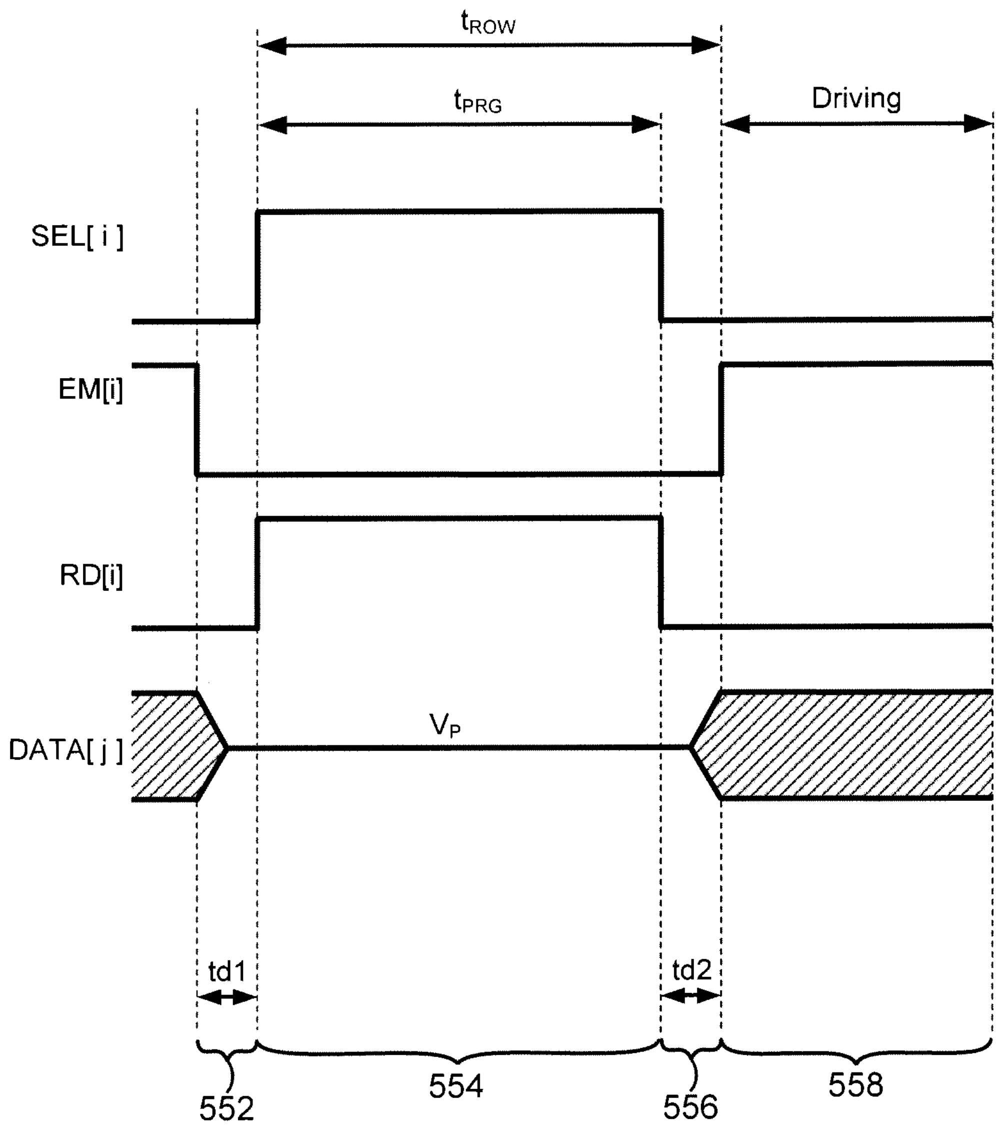
FIG. 8B is a timing diagram of exemplary operation cycles for the pixel illustrated in FIG. 8A.

FIG. 8B is a schematic timing diagram of exemplary operation cycles for the pixel 510 shown in FIG. 8A. As can be seen in FIG. 8B, the EM line is low to turn off the emission transistor 522 during the entire programming cycle 554, to produce a black frame. The emission transistor is also off during the entire measurement cycle controlled by the RD line 540, to avoid unwanted effects from the OLED 514. The pixel 510 can be programmed with no in-pixel compensation, as illustrated in FIG. 8B, or can be programmed in a manner similar to that described above for the circuit of FIG. 2A.

Figure 9A:
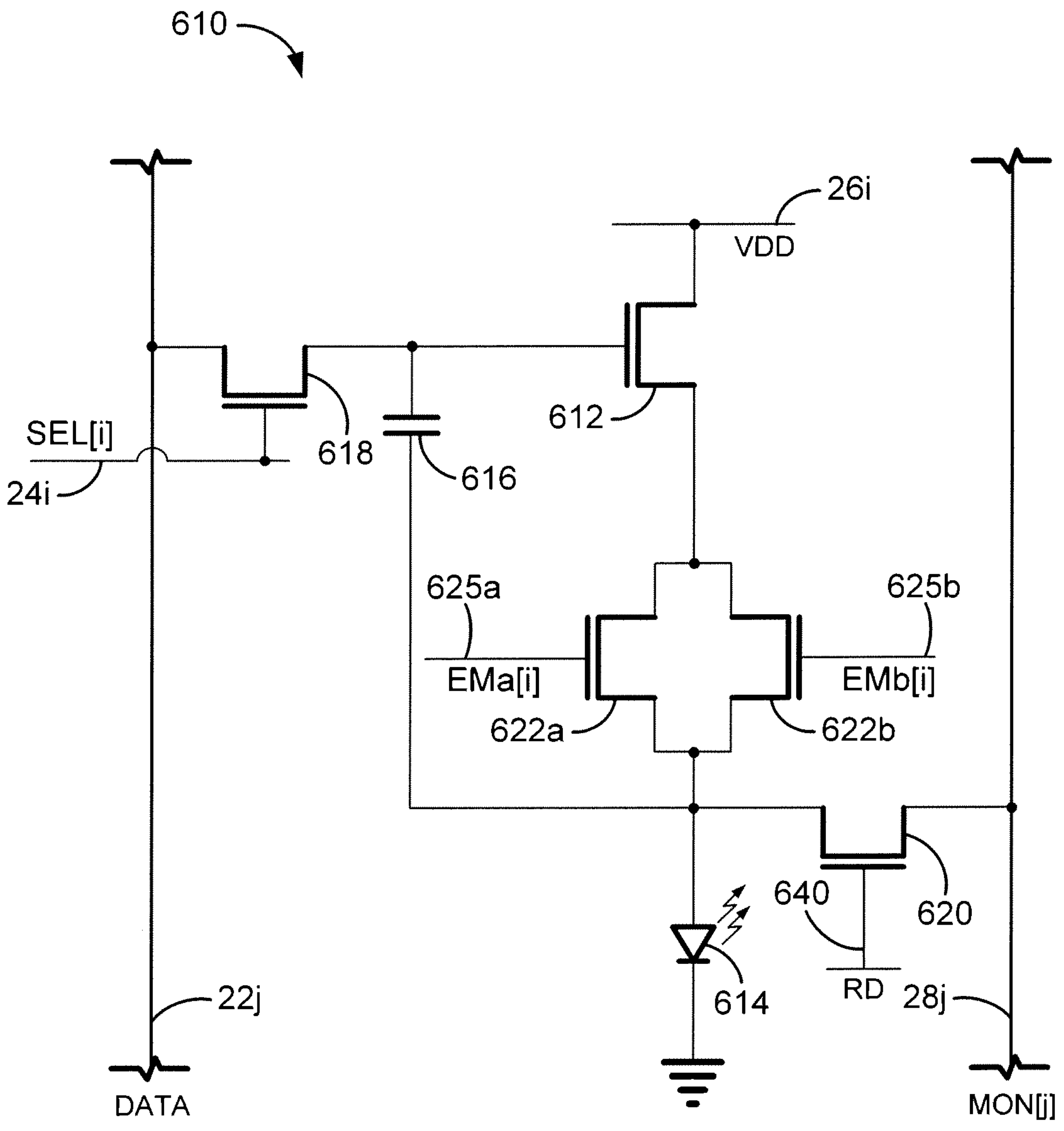
FIG. 9A is a circuit diagram of an exemplary pixel circuit configuration.
Figure 9B:
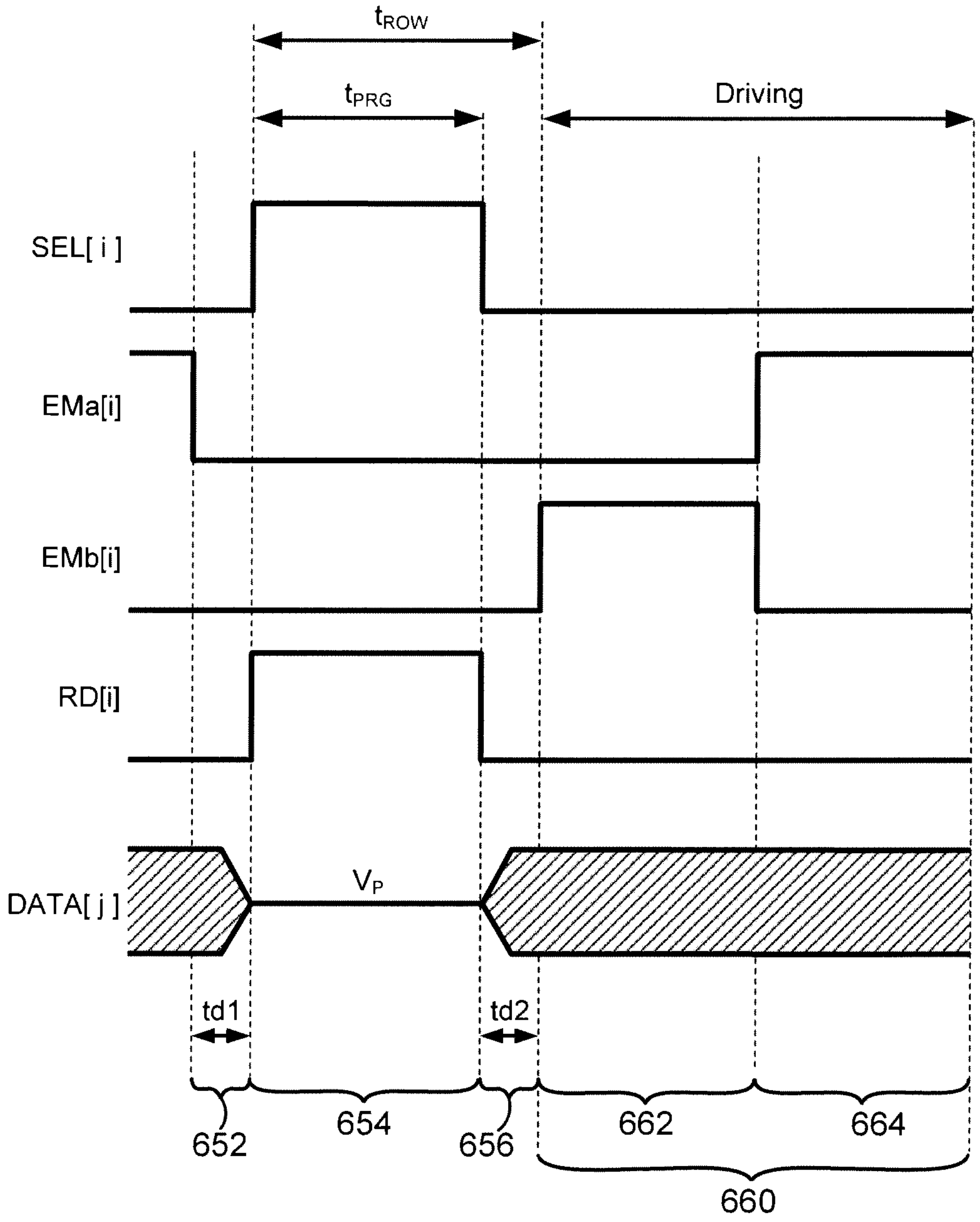
FIG. 9B is a timing diagram of first exemplary operation cycles for the pixel illustrated in FIG. 9A.
Figure 9C:
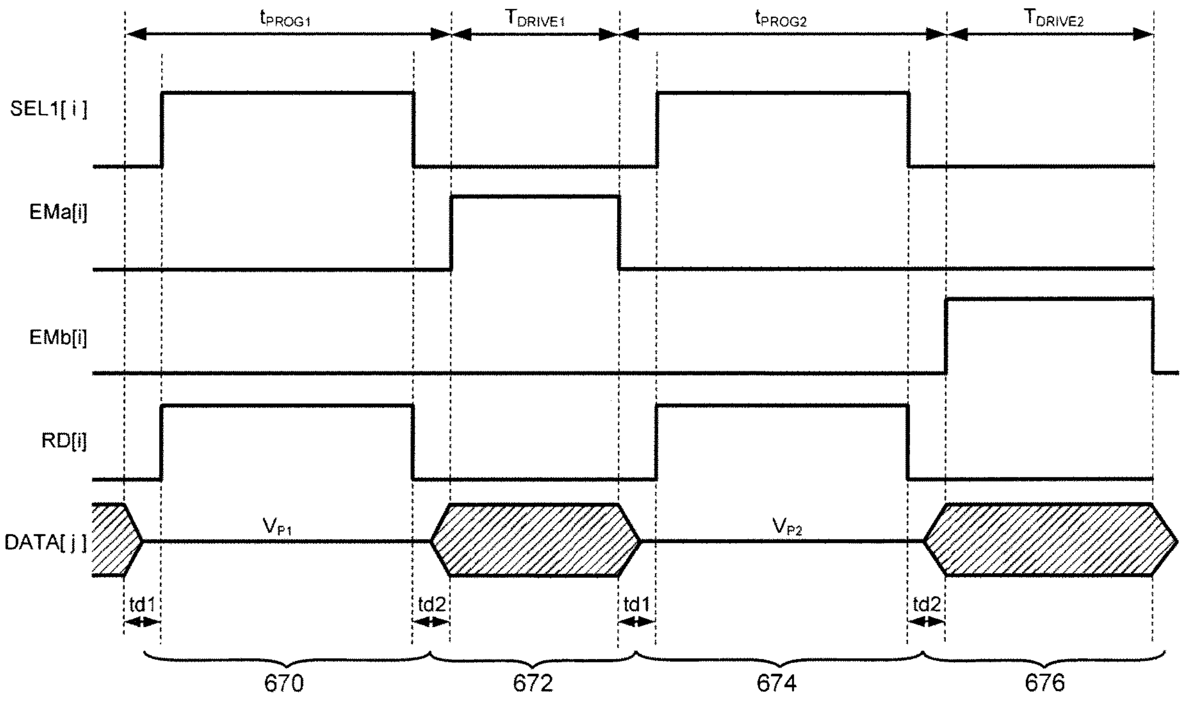
FIG. 9C is a timing diagram of second exemplary operation cycles for the pixel illustrated in FIG. 9A.

FIG. 9A is a circuit diagram of an exemplary driving circuit for a pixel 610 which is the same as the circuit of FIG. 8A except that the single emission transistor is replaced with a pair of emission transistors 622*a* and 622*b* connected in parallel and controlled by two different EM lines EMa and EMb. The two emission transistors can be used alternately to manage the aging of the emission transistors, as illustrated in the two timing diagrams in FIGS. 9B and 9C. In the timing diagram of FIG. 9B, the EMa line is high and the EMAb line is low during the first phase of a driving cycle 660, and then the EMa line is low and the EMAb line is high during the second phase of that same driving cycle. In the timing diagram of FIG. 9C, the EMa line is high and the EMAb line is low during a first driving cycle 672, and then the EMa line is low and the EMAb line is high during a second driving cycle 676.

Figure 10A:
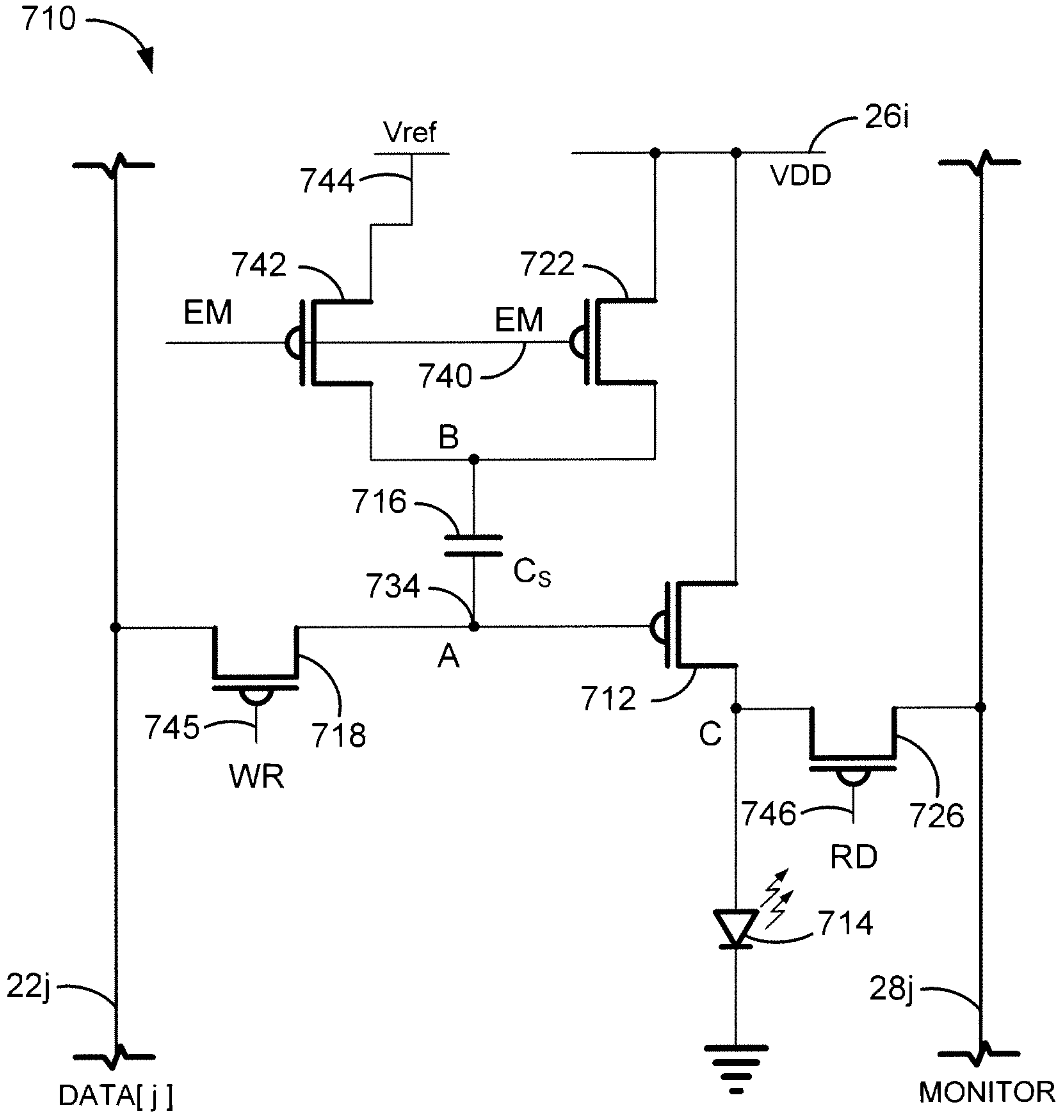
FIG. 10A is a circuit diagram of an exemplary pixel circuit configuration.

FIG. 10A is a circuit diagram of an exemplary driving circuit for a pixel 710 which is similar to the circuit of FIG. 3A described above, except that the circuit in FIG. 10A adds a monitor line 28*j*, the EM line controls both the Vref transistor 742 and the emission transistor 722, and the drive transistor 712 and the emission transistor 722 have separate connections to the VDD line. The drive transistor 12, the switching transistor 18, the storage capacitor 716, and the OLED 414 are the same as described above in the circuit of FIG. 3A.

Figure 10B:
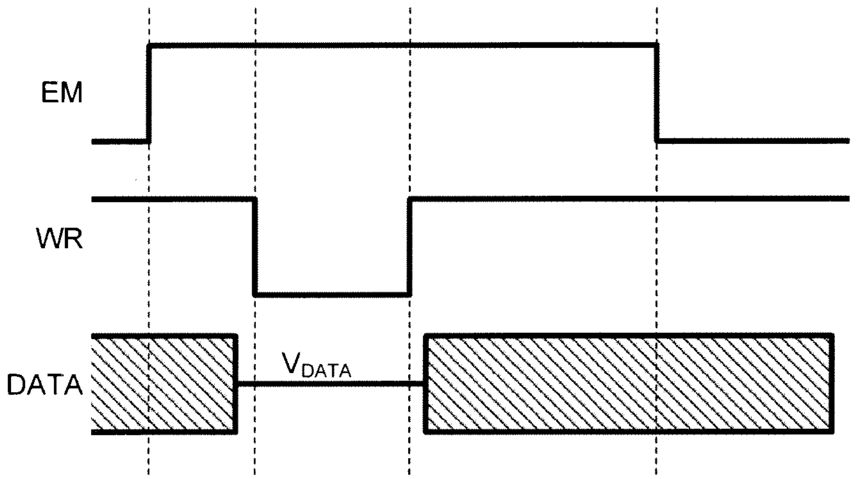
FIG. 10B is a timing diagram of exemplary operation cycles for the pixel illustrated in FIG. 10A in a programming cycle.

As can be seen in the timing diagram in FIG. 10B, the EM line 740 goes high and remains high during the programming cycle to turn off the p-type emission transistor 722. This disconnects the source side of the storage capacitor 716 from the VDD line 26*i* to protect the pixel 710 from fluctuations in the VDD voltage during the programming cycle, thereby avoiding any effect of VDD variations on the pixel current. The high EM line also turns on the n-type reference transistor 742 to connect the source side of the storage capacitor 716 to the Vrst line 744, so the capacitor terminal B is charged to Vrst. The gate voltage of the drive transistor 712 is high, so the drive transistor 712 is off. The voltage on the gate side of the capacitor 716 is controlled by the WR line 745 connected to the gate of the switching transistor 718 and, as shown in the timing diagram, the WR line 745 goes low during a portion of the programming cycle to turn on the p-type transistor 718, thereby applying the programming voltage Vp to the gate of the drive transistor 712 and the gate side of the storage capacitor 716.

When the EM line 740 goes low at the end of the programming cycle, the transistor 722 turns on to connect the capacitor terminal B to the VDD line. This causes the gate voltage of the drive transistor 712 to go to Vdd−Vp, and the drive transistor turns on. The charge on the capacitor is Vrst−Vdd−Vp. Since the capacitor 716 is connected to the VDD line during the driving cycle, any fluctuations in Vdd will not affect the pixel current.

Figure 10C:
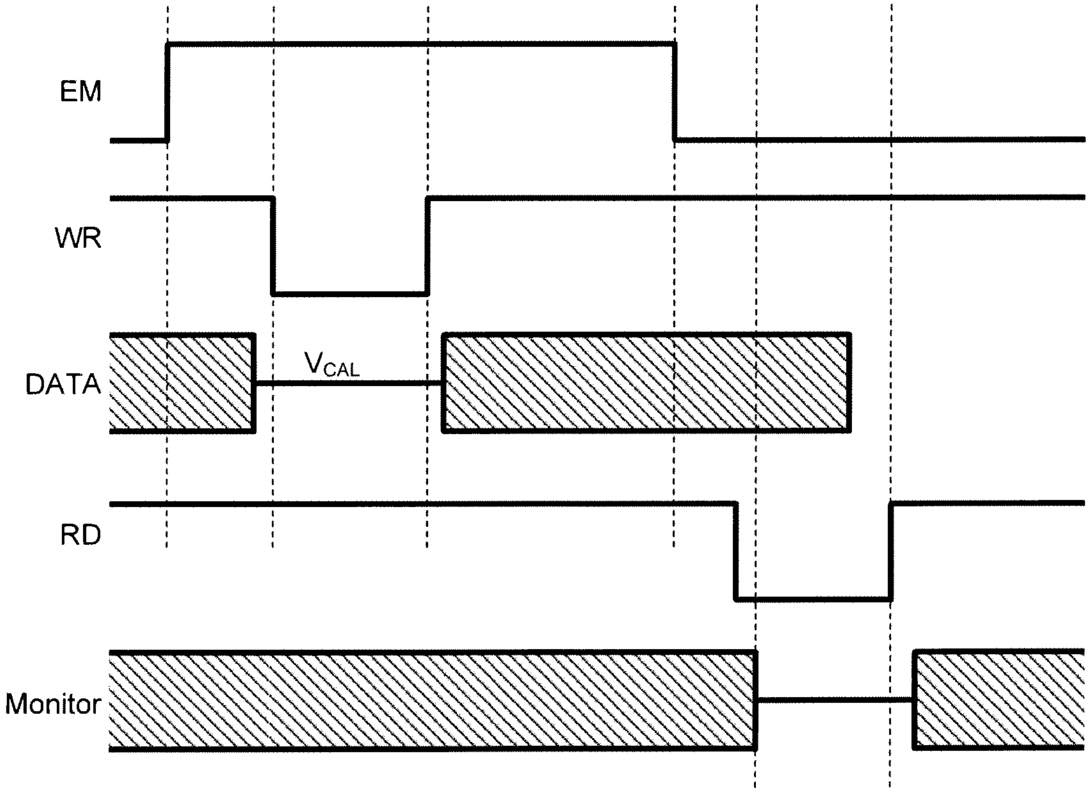
FIG. 10C is a timing diagram of exemplary operation cycles for the pixel illustrated in FIG. 10A in a TFT read cycle.

FIG. 10C is a timing diagram for a TFT read operation, which takes place during an interval when both the RD and EM lines are low and the WR line is high, so the emission transistor 722 is on and the switching transistor 718 is off. The monitor line 28*j* is connected to the source of the drive transistor 712 during the interval when the RD line 746 is low to turn on the read transistor 726, which overlaps the interval when current if flowing through the drive transistor to the OLED 714, so that a reading of that current flowing through the drive transistor 712 can be taken via the monitor line 28*j*.

Figure 10D:
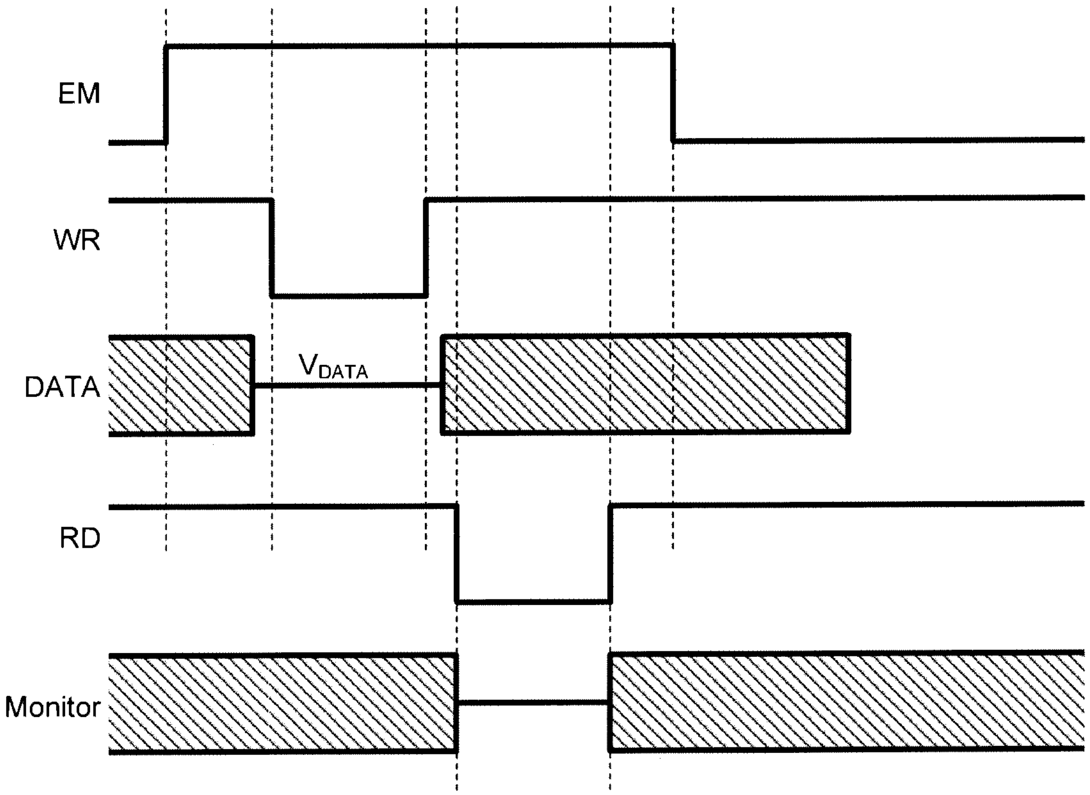
FIG. 10D is a timing diagram of exemplary operation cycles for the pixel illustrated in FIG. 10A in am OLED read cycle.

FIG. 10D is a timing diagram for an OLED read operation, which takes place during an interval when the RD line 746 is low and both the EM and WR lines are high, so the emission transistor 722 and the switching transistor 718 are both off. The monitor line 28*j* is connected to the source of the drive transistor 712 during the interval when the RD line is low to turn on the read transistor 726, so that a reading of the voltage on the anode of the OLED 714 can be taken via the monitor line 28*j*.

Figure 11A:
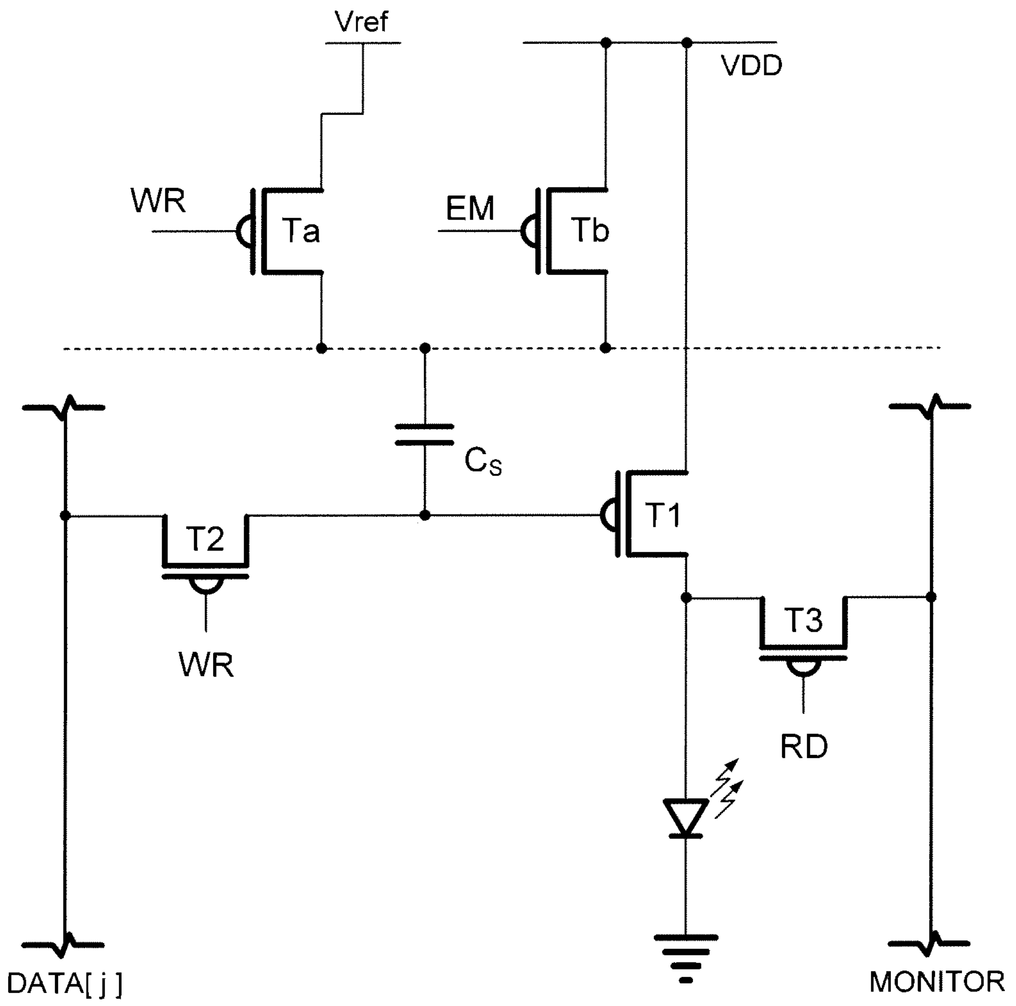
FIG. 11A is a circuit diagram of a pixel circuit with IR drop compensation.

FIG. 11A is a schematic circuit diagram of a pixel circuit with IR drop compensation. The voltages Vmonitor and Vdata are shown being supplied on two separate lines, but both these voltages can be supplied on the same line in this circuit, since Vmonitor has no role during the programming and Vdata has no role during the measurement cycle. The two transistors Ta and Tb can be shared between rows and columns for supplying the voltages Vref and Vdd, and the control signal EM can be shared between columns.

Figure 11B:
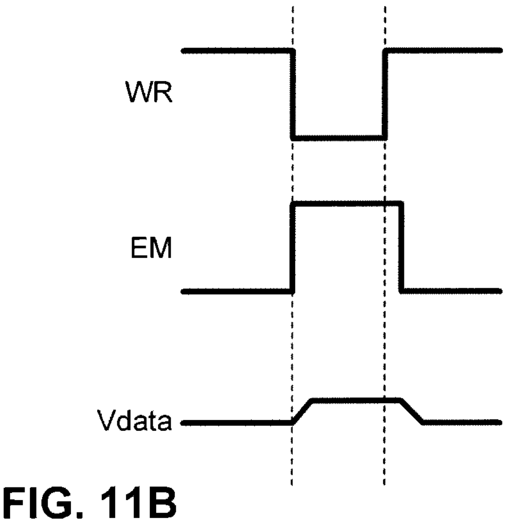
FIG. 11B is a timing diagram for an IR drop compensation operation of the circuit of FIG. 11A.

As depicted by the timing diagram in FIG. 11B, during normal operation of the circuit of FIG. 11A, the control signal WR turns on transistors T2 and Ta to supply the programming data Vp and the reference voltage Vref to opposite sides of the storage capacitor Cs, while the control signal EM turns off the transistor Tb. Thus the voltage stored in CS is Vref−Vp. During the driving cycle, the signal EM turns on the transistor Tb, and the signal WR turns off transistors T2 and Ta. Thus, the gate-source voltage of becomes Vref−Vp and independent of Vdd.

Figure 11C:
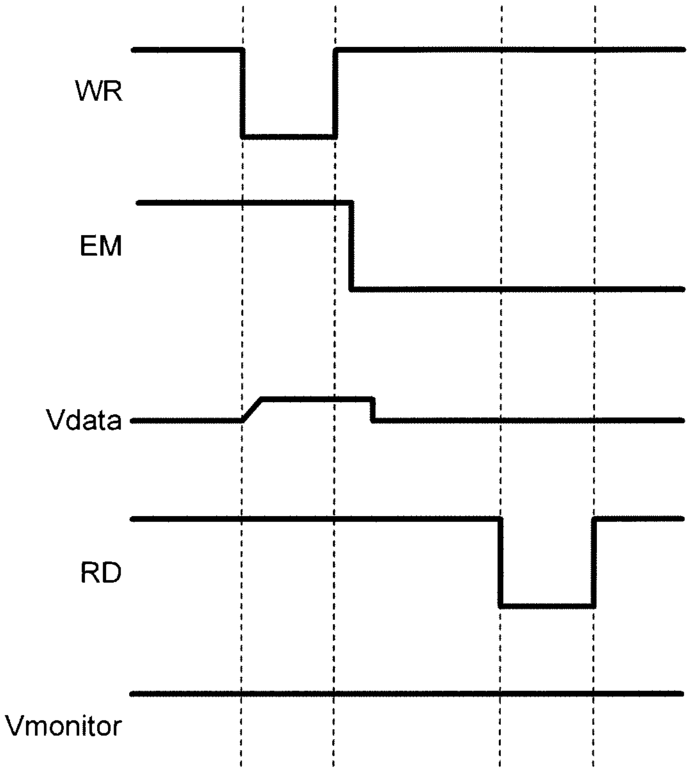
FIG. 11C is a timing diagram for reading out a parameter of the drive transistor in the circuit of FIG. 11A.

FIG. 11C is a timing diagram for obtaining a direct readout of parameters of the transistor T1 in the circuit of FIG. 11A. In a first cycle, the control signal WR turns on the transistor T2 and the pixel is programmed with a calibrated voltage Vdata for a known target current. During the second cycle, the control signal RD turns on the transistor T3, and the pixel current is read through the transistor T3 and the line Vmonitor. The voltage on the Vmonitor line is low enough during the second cycle to prevent the OLED from turning on. The calibrated voltage is then modified until the pixel current becomes the same as the target current. The final modified calibrated voltage is then used as a point in TFT current-voltage characteristics to extract the corresponding current through the transistor T1. Alternatively, a current can be supplied through the Vmonitor line and the transistor T3 while the transistors T2 and Ta are turned on, and Vdata is set to a fixed voltage. At this point the voltage created on the line Vmonitor is the gate voltage of the transistor T1 for the corresponding current.

Figure 11D:
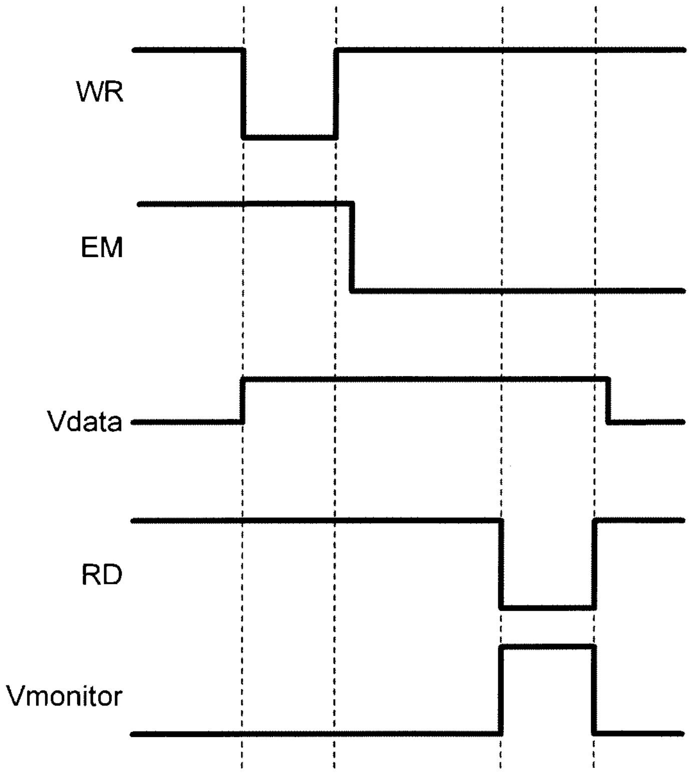
FIG. 11D is a timing diagram for reading out a parameter of the light emitting device in the circuit of FIG. 11A.

FIG. 11D is a timing diagram for obtaining a direct readout of the OLED voltage in the circuit of FIG. 11A. In the first cycle, the control signal WR turns on the transistor T2, and the pixel is programmed with an off voltage so that the drive transistor T1 does not provide any current. During the second cycle, the control signal RD turns on the transistor T3 so the OLED current can be read through the Vmonitor line. The Vmonitor voltage is pre-calibrated based for a known target current. The Vmonitor voltage is then modified until the OLED current becomes the same as the target current. Then the modified Vmonitor voltage is used as a point in the OLED current-voltage characteristics to extract a parameter of the OLED, such as its turn-on voltage.

The control signal EM can keep the transistor Tb turned off all the way to the end of the readout cycle, while the control signal WR keeps the transistor Ta turned on. In this case, the remaining pixel operations for reading the OLED parameter are the same as described above for FIG. 11C.

Alternatively, a current can be supplied to the OLED through the Vmonitor line so that the voltage on the Vmonitor line is the gate voltage of the drive transistor T1 for the corresponding current.

Figure 12A:
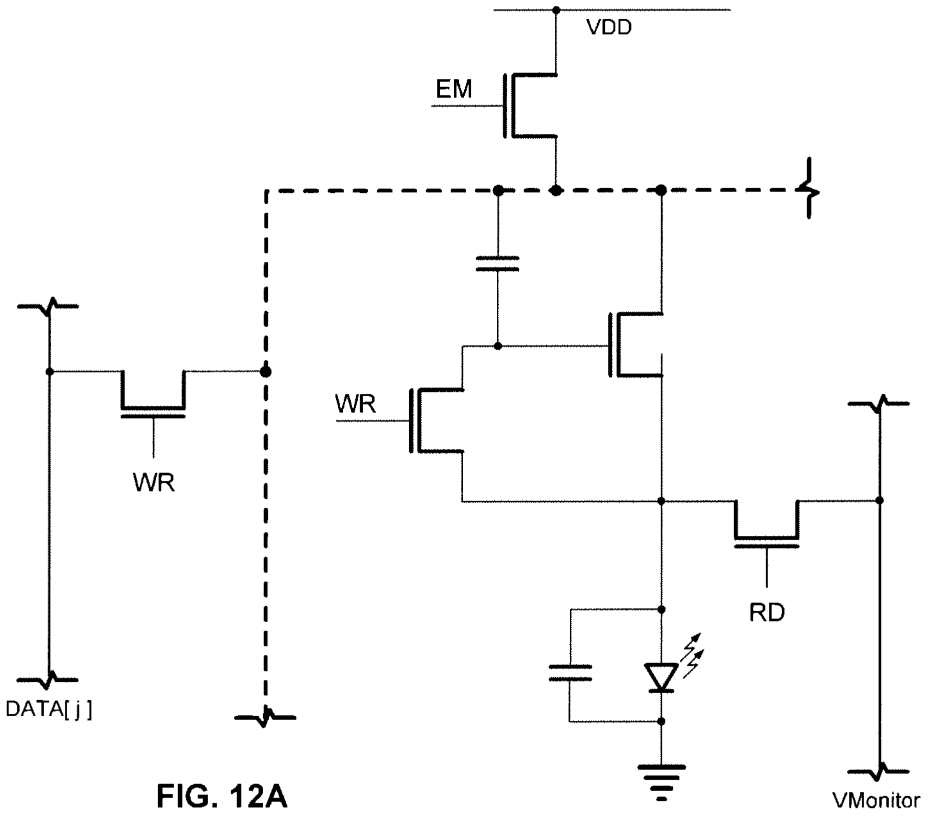
FIG. 12A is a circuit diagram of a pixel circuit with charge-based compensation.

FIG. 12A is a schematic circuit diagram of a pixel circuit with charge-based compensation. The voltages Vmonitor and Vdata are shown being supplied on the lines Vmonitor and Vdata, but Vmonitor can be Vdata as well, in which case Vdata can be a fixed voltage Vref. The two transistors Ta and Tb can be shared between adjacent rows for supplying the voltages Vref and Vdd, and Vmonitor can be shared between adjacent columns.

Figure 12B:
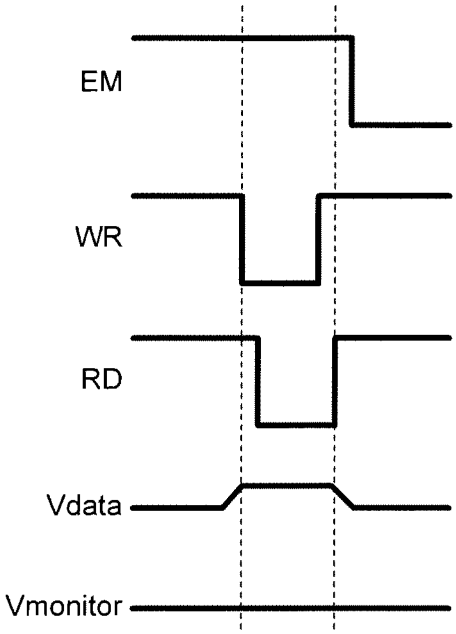
FIG. 12B is a timing diagram for a charge-based compensation operation of the circuit of FIG. 12A.

The timing diagram in FIG. 12B depicts normal operation of the circuit of FIG. 12A. The control signal WR turns on the respective transistors Ta and T2 to apply the programming voltage Vp from the Vdata line to the capacitor Cs, and the control signal RD turns on the transistor T3 to apply the voltage Vref through the Vmonitor line and transistor T3 to the node between the drive transistor T1 and the OLED. Vref is generally low enough to prevent the OLED from turning on. As depicted in the timing diagram in FIG. 12B, the control signal RD turns off the transistor T3 before the control signal WR turns off the transistors Ta and T2. During this gap time, the drive transistor T1 starts to charge the OLED and so compensates for part of the variation of the transistor T1 parameter, since the charge generated will be a function of the T1 parameter. The compensation is independent of the IR drop since the source of the drive transistor T1 is disconnected from Vdd during the programming cycle.

Figure 12C:
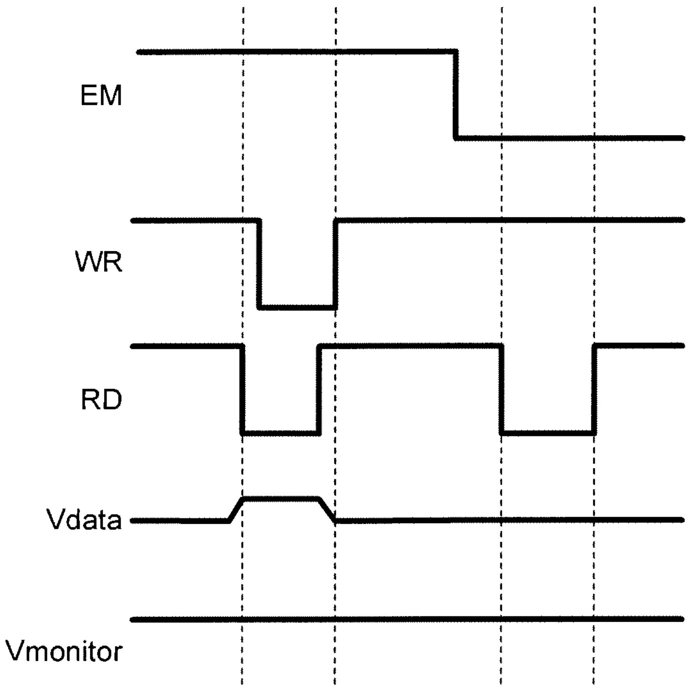
FIG. 12C is a timing diagram for a direct readout of a parameter of the light emitting device in the circuit of FIG. 12A.

The timing diagram in FIG. 12C depicts a direct readout of a parameter of the drive transistor T1 in the circuit of FIG. 12A. In the first cycle, the circuit is programmed with a calibrated voltage for a known target current. During the second cycle, the control signal RD turns on the transistor T3 to read the pixel current through the Vmonitor line. The Vmonitor voltage is low enough during the second cycle to prevent the OLED from turning on. Next, the calibrated voltage is varied until the pixel current becomes the same as the target current. The final value of the calibrated voltage is used as a point in the current-voltage characteristics of the drive transistor T1 to extract a parameter of that transistor. Alternatively, a current can be supplied to the OLED through the Vmonitor line, while the control signal WR turns on the transistor T2 and Vdata is set to a fixed voltage, so that the voltage on the Vmonitor line is the gate voltage of the drive transistor T1 for the corresponding current.

Figure 12D:
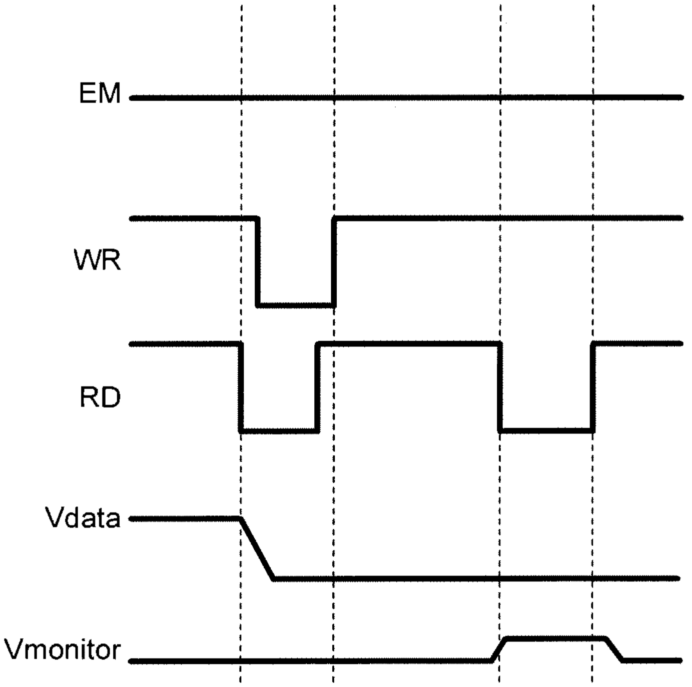
FIG. 12D is a timing diagram for an indirect readout of a parameter of the light emitting device in the circuit of FIG. 12A.

The timing diagram in FIG. 12D depicts a direct readout of a parameter of the OLED in the circuit of FIG. 12A. In the first cycle, the circuit is programmed with an off voltage so that the drive transistor T1 does not provide any current. During the second cycle, the control signal RD turns on the transistor T3, and the OLED current is read through the Vmonitor line. The Vmonitor voltage during second cycle is pre-calibrated, based for a known target current. Then the Vmonitor voltage is varied until the OLED current becomes the same as the target current. The final value of the Vmonitor voltage is then used as a point in the current-voltage characteristics of the OLED to extracts a parameter of the OLED. One can extend the EM off all the way to the end of the readout cycle and keep the WR active. In this case, the remaining pixel operations for reading OLED will be the same as previous steps. One can also apply a current to the OLED through Vmonitor. At this point the created voltage on Vmonitor is the TFT gate voltage for the corresponding current.

Figure 12E:
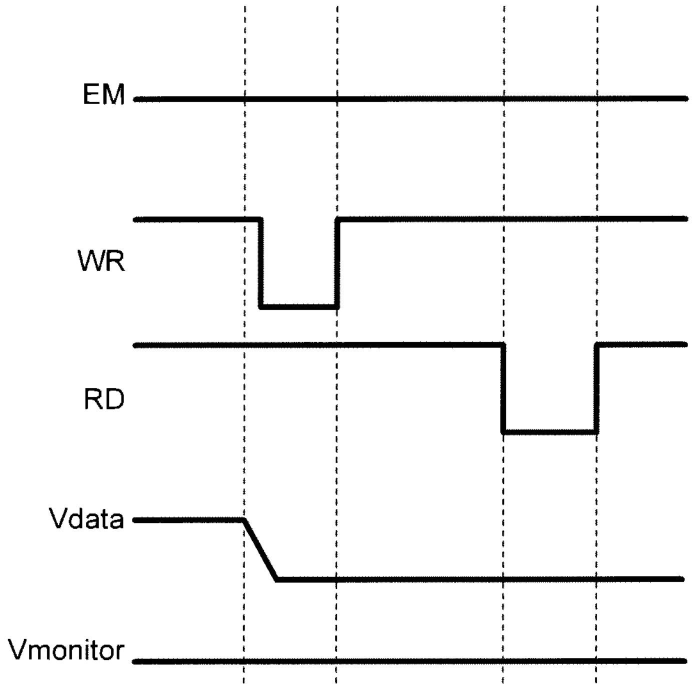
FIG. 12E is a timing diagram for a direct readout of a parameter of the drive transistor in the circuit of FIG. 12A.

The timing diagram in FIG. 12E depicts an indirect readout of a parameter of the OLED in the circuit of FIG. 12A. Here the pixel current is read out in a manner similar to that described above for the timing diagram of FIG. 12C. The only difference is that during the programming, the control signal RD turns off the transistor T3, and thus the gate voltage of the drive transistor T1 is set to the OLED voltage. Thus, the calibrated voltage needs to account for the effect of the OLED voltage and the parameter of the drive transistor T1 to make the pixel current equal to the target current. This calibrated voltage and the voltage extracted by the direct T1 readout can be used to extract the OLED voltage. For example, subtracting the calibrated voltage extracted from this process with the calibrated voltage extracted from TFT direct readout will result to the effect of OLED if the two target currents are the same.

Figure 13:
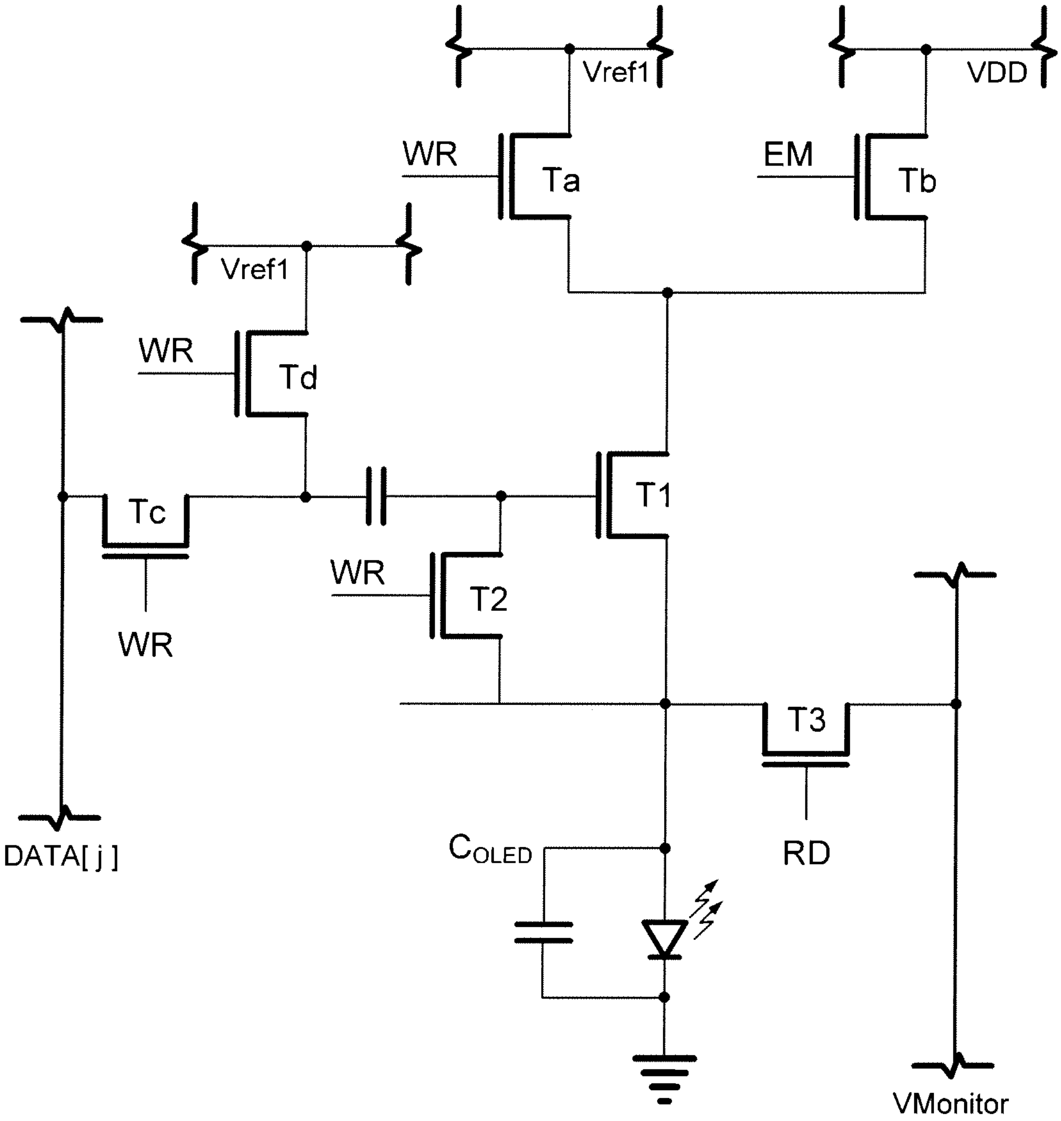
FIG. 13 is a circuit diagram of a biased pixel circuit.

FIG. 13 is a schematic circuit diagram of a biased pixel circuit with charge-based compensation. The two transistors Ta and Tb can be shared between adjacent rows and columns for supplying the voltages Vdd and Vref1, the two transistors Tc and Td can be shared between adjacent rows for supplying the voltages Vdata and Vref2, and the Vmonitor line can be shared between adjacent columns.

In normal operation of the circuit of FIG. 13, the control signal WR turns on the transistors Ta, Tc and T2, the control signal RD turns on the transistor T3, and the control signal EM turns off the transistor Tb and Td. The voltage Vref2 can be Vdata. The Vmonitor line is connected to a reference current, and the Vdata line is connected to a programming voltage from the source driver. The gate of the drive transistor T1 is charged to a bias voltage related to the reference current from the Vmonitor line, and the voltage stored in the capacitor Cs is a function of the programming voltage Vp and the bias voltage. After programming, the control signals WR and Rd turn off the transistors Ta, Tc, T2 and T3, and EM turns on the transistor Tb. Thus, the gate-source voltage of the transistor T1 is a function of the voltage Vp and the bias voltage. Since the bias voltage is a function of parameters of the transistor T1, the bias voltage becomes insensitive to variations in the transistor T1. In the same operation, the voltages Vref1 and Vdata can be swapped, and the capacitor Cs can be directly connected to Vdd or Vref, so there is no need for the transistors Tc and Td.

In another operating mode, the Vmonitor line is connected to a reference voltage. During the first cycle in this operation, the control signal WR turns on the transistors Ta, Tc and T2, the control signal RD turns on the transistor T3. Vdata is connected to Vp. During the second cycle of this operation, the control signal RD turns off the transistor T3, and so the drain voltage of the transistor T1 (the anode voltage of the OLED), starts to increase and develops a voltage VB. This change in voltage is a function of the parameters of the transistor T1. During the driving cycle, the control signals WR and RD turn off the transistors Ta, Tc, T2 and T3. Thus, the source gate-voltage of the transistor T1 becomes a function of the voltages Vp and VB. In this mode of operation, the voltages Vdata and Vref1 can be swapped, and Cs can be connected directly to Vdd or a reference voltage, so there is no need for the transistors Td and Tc.

For a direct readout of a parameter of the drive transistor T1, the pixel is programmed with one of the aforementioned operations using a calibrated voltage. The current of the drive transistor T1 is then measured or compared with a reference current. In this case, the calibrated voltage can be adjusted until the current through the drive transistor is substantially equal to a reference current. The calibrated voltage is then used to extract the desired parameter of the drive transistor.

For a direct readout of the OLED voltage, the pixel is programmed with black using one of the operations described above. Then a calibrated voltage is supplied to the Vmonitor line, and the current supplied to the OLED is measured or compared with a reference current. The calibrated voltage can be adjusted until the OLED current is substantially equal to a reference current. The calibrated voltage can then be used to extract the OLED parameters.

For an indirect readout of the OLED voltage, the pixel current is read out in a manner similar to the operation described above for the direct readout of parameters of the drive transistor T1. The only difference is that during the programming, the control signal RD turns off the transistor T3, and thus the gate voltage of the drive transistor T1 is set to the OLED voltage. The calibrated voltage needs to account for the effect of the OLED voltage and the drive transistor parameter to make the pixel current equal to the target current. This calibrated voltage and the voltage extracted from the direct readout of the T1 parameter can be used to extract the OLED voltage. For example, subtracting the calibrated voltage extracted from this process from the calibrated voltage extracted from the direct readout of the drive transistor corresponds to the effect of the OLED if the two target currents are the same.

Figure 14A:
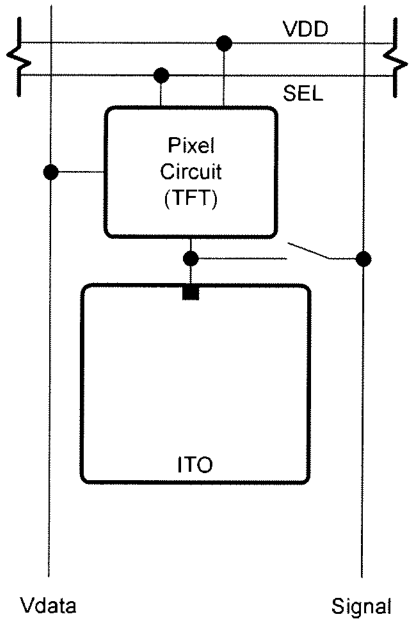
FIG. 14A is a diagram of a pixel circuit and an electrode connected to a signal line.
Figure 14B:
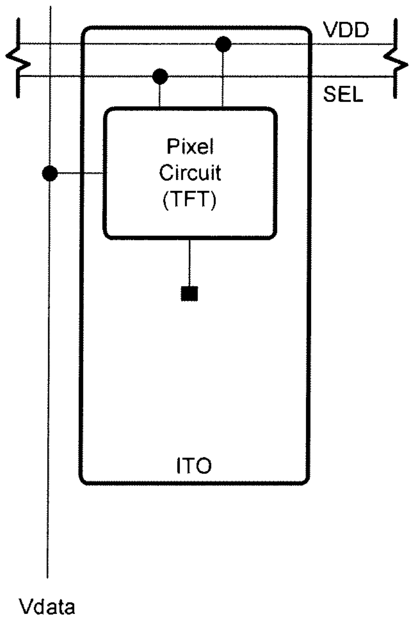
FIG. 14B is a diagram of a pixel circuit and an expanded electrode replacing the signal line shown in FIG. 14A.

FIG. 14A illustrates a pixel circuit with a signal line connected to an OLED and the pixel circuit, and FIG. 14B illustrates the pixel circuit with an electrode ITO patterned as a signal line.

The same system used to compensate the pixel circuits can be used to analyze an entire display panel during different stages of fabrication, e.g., after backplane fabrication, after OLED fabrication, and after full assembly. At each stage the information provided by the analysis can be used to identify the defects and repair them with different techniques such as laser repair. To be able to measure the panel, there must be either a direct path to each pixel to measure the pixel current, or a partial electrode pattern may be used for the measurement path, as depicted in FIG. 14B. In the latter case, the electrode is patterned to contact the vertical lines first, and after the measurement is finished, the balance of the electrode is completed.

Figure 15:
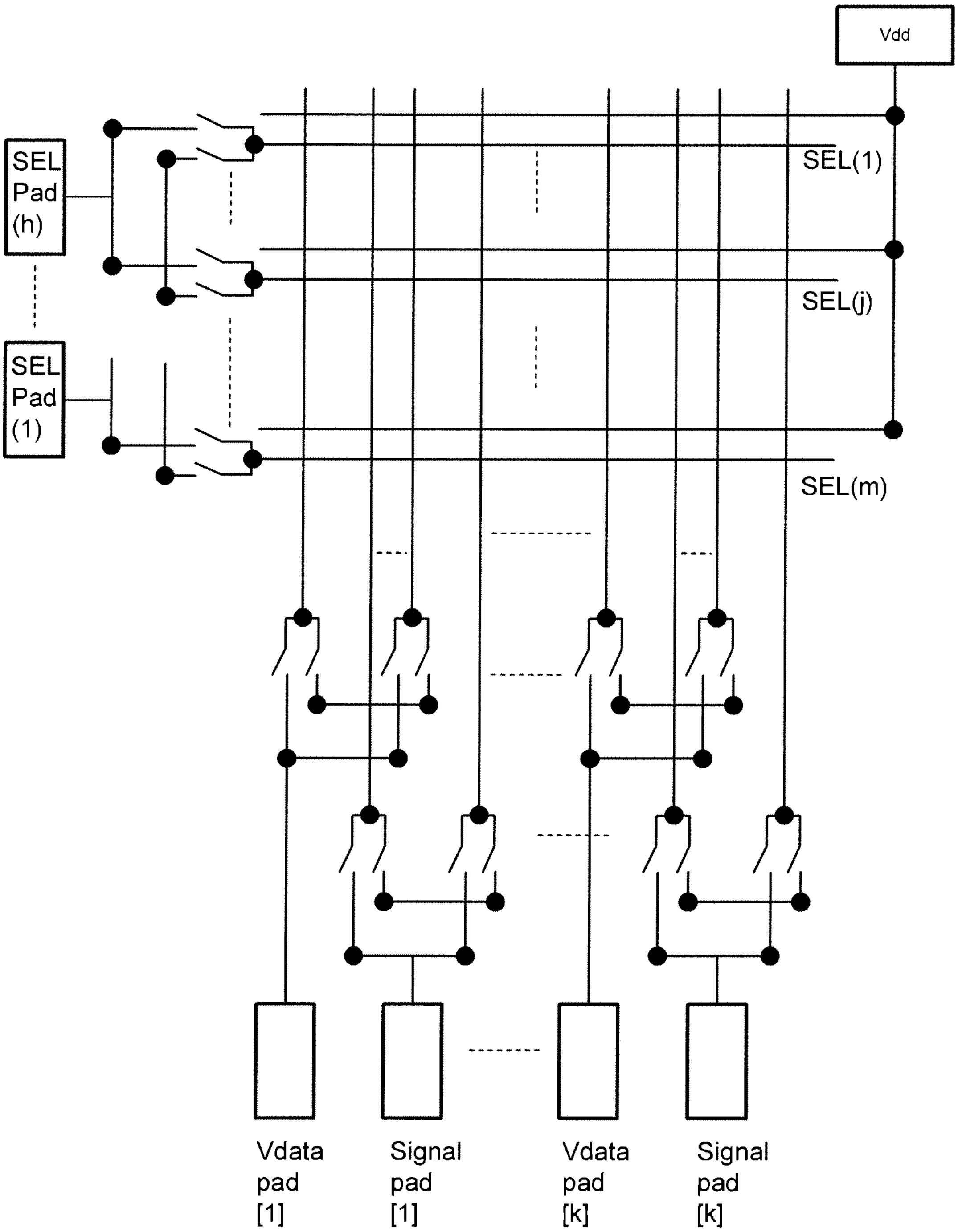
FIG. 15 is a circuit diagram of a pad arrangement for use in the probing of a display panel.

FIG. 15 illustrates a typical arrangement for a panel and its signals during a panel test, including a pad arrangement for probing the panel. Every other signal is connected to one pad through a multiplexer having a default stage that sets the signal to a default value. Every signal can be selected through the multiplexer to either program the panel or to measure a current, voltage and/or charge from the individual pixel circuits.

FIG. 16 illustrates a pixel circuit for use in testing. The following are some of the factory tests that can be carried out to identify defects in the pixel circuits. A similar concept can be applied to different pixel circuits, although the following tests are defined for the pixel circuit shown in FIG. 16.

Test # 1:

WR is high (Data=high and Data=low and Vdd=high).

| | $I_{data\_high} < I_{th\_high}$ | $I_{data\_high} > I_{th\_high}$ |
|---|---|---|
| $I_{data\_low} > I_{th\_low}$ | NA | T1: short<br>\|\| B: stock at high<br>(if data current is high, B is stock at high) |

-continued

| | $I_{data\_high} < I_{th\_high}$ | $I_{data\_high} > I_{th\_high}$ |
|---|---|---|
| $I_{data\_low} < I_{th\_low}$ | T1: open \|\| T3: open | T1: OK && T2: ? && T3: OK |

Here, $I_{th\_low}$ is the lowest acceptable current allowed for Data=low, and $I_{th\_high}$ is the highest acceptable current for Data=high.

Test #2:

Static: WR is high (Data=high and Data=low).

Dynamic: WR goes high and after programming it goes to low (Data=low to high and Data=high to low).

| | $I_{static\_high} < I_{th\_high\_st}$ | $I_{static\_high} > I_{th\_high\_st}$ |
|---|---|---|
| $I_{dyn\_high} > I_{th\_high\_dyn}$ | ? | T2: OK |
| $I_{dyn\_high} < I_{th\_high\_dyn}$ | T2: open | T2: short |

$I_{th\_high\_dyn}$ is the highest acceptable current for data high with dynamic programming.

$I_{th\_high\_low}$ is the highest acceptable current for data high with static programming.

One can also use the following pattern:

Static: WR is high (Data=low and Data=high).

Dynamic: WR goes high and after programming it goes to low (Data=high to low).

FIG. 17 illustrates a pixel circuit for use in testing a full display. The following are some of the factory tests that can be carried out to identify defects in the display. A similar concept can be applied to different circuits, although the following tests are defined for the circuit shown in FIG. 17.

Test 3:

Measuring T1 and OLED current through monitor.

Condition 1: T1 is OK from the backplane test.

| | $I_{oled} > I_{oled\_high}$ | $I_{oled} < I_{oled\_low}$ | $I_{oled\ is\ OK}$ |
|---|---|---|---|
| $I_{tft} > I_{tft\_high}$ | x | x | x |
| $I_{tft} < I_{tft\_low}$ | OLED: short | OLED: open \|\| T3: open | OLED: open |
| $I_{tft\ is\ OK}$ | x | OLED: open | OLED: ok |

$I_{tft\_high}$ is the highest possible current for TFT current for a specific data value.

$I_{tft\_high}$ is the lowest possible current for TFT current for a specific data value.

$I_{oled\_high}$ is the highest possible current for OLED current for a specific OLED voltage.

$I_{oled\_low}$ is the lowest possible current for OLED current for a specific OLED voltage.

Test 4:

Measuring T1 and OLED current through monitor

Condition 2: T1 is open from the backplane test

| | $I_{oled} > I_{oled\_high}$ | $I_{oled} < I_{oled\_low}$ | $I_{oled\ is\ OK}$ |
|---|---|---|---|
| $I_{tft} > I_{tft\_high}$ | X | X | X |
| $I_{tft} < I_{tft\_low}$ | OLED: short | OLED: open \|\| T3: open | OLED: open |
| $I_{tft\ is\ OK}$ | x | x | x |

Test 5:

Measuring T1 and OLED current through monitor

Condition 3: T1 is short from the backplane test

| | $I_{oled} > I_{oled\_high}$ | $I_{oled} < I_{oled\_low}$ | $I_{oled\ is\ OK}$ |
|---|---|---|---|
| $I_{tft} > I_{tft\ high}$ | X | X | X |
| $I_{tft} < I_{tft\_low}$ | OLED: short | OLED: open \|\| T3: open | OLED: open |
| $I_{tft\ is\ OK}$ | x | x | x |

To compensate for defects that are darker than the sounding pixels, one can use surrounding pixels to provide the extra brightness required for the video/images. There are different methods to provide this extra brightness, as follows:

1. Using all immediate surrounding pixels and divide the extra brightness between each of them. The challenge with this method is that in most of the cases, the portion of assigned to each pixel will not be generated by that pixel accurately. Since the error generated by each surrounding pixel will be added to the total error, the error will be very large reducing the effectiveness of the correction.
2. Using on pixel (or two) of the surrounding pixels generate the extra brightness required by defective pixel. In this case, one can switch the position of the active pixels in compensation so that minimize the localized artifact.

During the lifetime of the display, some soft defects can create stock on (always bright) pixels which tends to be very annoying for the user. The real-time measurement of the panel can identify the newly generated stock on pixel. One can use extra voltage through monitor line and kill the OLED to turn it to dark pixel. Also, using the compensation method describe in the above, it can reduce the visual effect of the dark pixels.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A display system comprising:

an array of pixels, each pixel including a pixel circuit that includes a light emitting device, a drive transistor for driving current through the light emitting device according to a driving voltage across the drive transistor during an emission cycle, said drive transistor having a gate, a source and a drain, and a storage capacitor coupled to the gate of said drive transistor for controlling said driving voltage; and a controller configured for supplying to a pixel circuit over a first signal line a first voltage that is related to a known target current, reading an actual current over a monitor line coupled to the pixel and modifying said first voltage until the actual current read over the monitor line substantially matches said target current, storing a value of the modified first voltage as a data point in current-voltage characteristics stored for an element of the pixel circuit, and extracting a current for the element of the pixel circuit corresponding to the modified first voltage based on the current-voltage characteristics stored for the element of the pixel circuit.

2. The display system of claim 1 wherein the controller is further configured for extracting an electrical characteristic parameter with use of the extracted current corresponding to the modified first voltage.

3. The display system of claim 2 wherein the element of the pixel circuit is the light emitting device, wherein the first signal line is the monitor line coupled to a node between the drive transistor and the light emitting device, wherein said actual current is the current passing through the light emitting device, and wherein the controller is further configured for deactivating the drive transistor during said supplying and reading.

4. The display system of claim 3 wherein the element of the pixel circuit is the drive transistor, wherein the first signal line is a data line coupled to the storage capacitor, and wherein said actual current is the driving current through the drive transistor, and wherein the controller is further configured for deactivating the light emitting device during said supplying and reading.

5. The display system of claim 4 further comprising:

a reference voltage source coupled to a first switching transistor that controls the coupling of said reference voltage source to a first terminal of said storage capacitor; and a programing voltage source for providing the first voltage coupled to a second switching transistor that controls the coupling of said programming voltage source over the data line to a second terminal of the storage capacitor, and wherein the controller is further configured for programming the pixel by controlling the first switching transistor, the second switching transistor, the reference voltage source and the programming voltage source, so that said storage capacitor stores a voltage equal to the difference between said reference voltage and said first voltage and causing the drive transistor to drive the actual current.

6. The display system of claim 5 wherein the first terminal of the storage capacitor is coupled to one of a source and a drain of the drive transistor and the second terminal of the storage capacitor is coupled to the gate of the drive transistor.

7. The display system of claim 5 wherein the second terminal of the storage capacitor is coupled to one of a source and a drain of the drive transistor, the first terminal of the storage capacitor is coupled to the gate of the drive transistor, and the reference voltage source is coupled over the monitor line, the first switching transistor, and a third switching transistor to the first terminal of the storage capacitor, and wherein the controller is further configured for programming the pixel by controlling the third switching transistor along with the first switching transistor, the second switching transistor, the reference voltage source and the programming voltage source, so that said storage capacitor stores a voltage equal to the difference between said reference voltage and said first voltage and causing the drive transistor to drive the actual current.

8. A display system comprising:

an array of pixels, each pixel including a pixel circuit that includes a light emitting device, a drive transistor for driving current through the light emitting device according to a driving voltage across the drive transistor during an emission cycle, said drive transistor having a gate, a source and a drain, and a storage capacitor coupled to the gate of said drive transistor for controlling said driving voltage; and a controller configured for supplying to a pixel circuit over a first signal line coupled to the pixel circuit a first current, reading an actual voltage over the first signal line, the actual voltage a function of the first current supplied to the pixel circuit, storing a value of the actual voltage as a data point in current-voltage characteristics stored for an element of the pixel circuit.

9. The display system of claim 8 wherein the controller is further configured for extracting an electrical characteristic parameter with use of the data point in the current-voltage characteristics for the element of the pixel circuit.

10. The display system of claim 8 wherein the element of the pixel circuit is the light emitting device, wherein the first current supplied to the pixel circuit passes through the light-emitting device, wherein the first signal line is coupled to a node between the drive transistor and the light emitting device, wherein said actual voltage is a voltage of the node, and wherein the controller is further configured for deactivating the drive transistor during said supplying and reading.

11. The display system of claim 8 wherein the element of the pixel circuit is the drive transistor, wherein the first current supplied to the pixel circuit passes through the drive transistor, wherein the first signal line is coupled to the gate of the drive transistor, and wherein said actual voltage is a voltage of the gate of the drive transistor, and wherein the controller is further configured for deactivating the light emitting device during said supplying and reading.

12. The display system of claim 11 further comprising:

a current source for providing said first current over the first signal line; and a programing voltage source for providing a fixed voltage coupled to a first switching transistor that controls the coupling of said programming voltage source over a data line to a first terminal of the storage capacitor and one of a drain and a source of the drive transistor, wherein the second terminal of the storage capacitor is coupled to the gate of the drive transistor, wherein the first signal line is coupled over at least one switching transistor to the gate of the driving transistor, and wherein the controller is further configured for controlling the at least one switching transistor, the first switching transistor, the programming voltage source and the current source, so that during the provision of the fixed reference voltage and the supplying of the first current, the gate of the drive transistor settles to a voltage which is measured as the actual voltage.

13. A method of driving a display system having an array of pixels, each pixel including a pixel circuit that includes a light emitting device, a drive transistor for driving current through the light emitting device according to a driving voltage across the drive transistor during an emission cycle, said drive transistor having a gate, a source and a drain, and a storage capacitor coupled to the gate of said drive transistor for controlling said driving voltage, the method comprising:

supplying to a pixel circuit over a first signal line a first voltage that is related to a known target current;

reading an actual current over a monitor line coupled to the pixel and modifying said first voltage until the actual current read over the monitor line substantially matches said target current;

storing a value of the modified first voltage as a data point in current-voltage characteristics stored for an element of the pixel circuit; and extracting a current for the element of the pixel circuit corresponding to the modified first voltage based on the current-voltage characteristics stored for the element of the pixel circuit.

14. The method of claim 13 further comprising:

extracting an electrical characteristic parameter with use of the extracted current corresponding to the modified first voltage.

15. The method of claim 13 further comprising:

deactivating the drive transistor during said supplying and reading, wherein the element of the pixel circuit is the light emitting device, wherein the first signal line is the monitor line coupled to a node between the drive transistor and the light emitting device, wherein said actual current is the current passing through the light emitting device.

16. The method of claim 13 further comprising:

deactivating the light emitting device during said supplying and reading, wherein the element of the pixel circuit is the drive transistor, wherein the first signal line is a data line coupled to the storage capacitor, and wherein said actual current is the driving current through the drive transistor.

17. A method of driving a display system having an array of pixels, each pixel including a pixel circuit that includes a light emitting device, a drive transistor for driving current through the light emitting device according to a driving voltage across the drive transistor during an emission cycle, said drive transistor having a gate, a source and a drain, and a storage capacitor coupled to the gate of said drive transistor for controlling said driving voltage, the method comprising:

supplying to a pixel circuit over a first signal line coupled to the pixel circuit a first current, reading an actual voltage over the first signal line, the actual voltage a function of the first current supplied to the pixel circuit, storing a value of the actual voltage as a data point in current-voltage characteristics stored for an element of the pixel circuit, and extracting a current for the element of the pixel circuit corresponding to the actual voltage based on the current-voltage characteristics stored for the element of the pixel circuit.

18. The method of claim 17 further comprising:

extracting an electrical characteristic parameter with use of the extracted current corresponding to the actual voltage.

19. The method of claim 17 further comprising:

deactivating the drive transistor during said supplying and reading, wherein the element of the pixel circuit is the light emitting device, wherein the first current supplied to the pixel circuit passes through the light-emitting device, wherein the first signal line is coupled to a node between the drive transistor and the light emitting device, wherein said actual voltage is a voltage of the node.

20. The method of claim 17 further comprising:

deactivating the light emitting device during said supplying the reading, wherein the element of the pixel circuit is the drive transistor, wherein the first current supplied to the pixel circuit passes through the drive transistor, wherein the first signal line is coupled to the gate of the drive transistor, and wherein said actual voltage is a voltage of the gate of the drive transistor.

21. The method of claim 20 further comprising:

providing a fixed voltage over a data line to a first terminal of the storage capacitor and one of a drain and a source of the drive transistor, wherein the second terminal of the storage capacitor is coupled to the gate of the drive transistor, wherein the first signal line is coupled to the gate of the driving transistor.

* * * * *